(12) United States Patent
Roeseler et al.

(10) Patent No.: US 7,128,294 B2
(45) Date of Patent: Oct. 31, 2006

(54) METHODS AND APPARATUSES FOR LAUNCHING UNMANNED AIRCRAFT, INCLUDING METHODS AND APPARATUSES FOR LAUNCHING AIRCRAFT WITH A WEDGE ACTION

(75) Inventors: Cory Roeseler, Hood River, OR (US); Andreas H. von Flotow, Hood River, OR (US)

(73) Assignee: The Insitu Group, Inc., Bingen, WA (US)

( * ) Notice: Subject to any disclaimer, the term of this patent is extended or adjusted under 35 U.S.C. 154(b) by 0 days.

(21) Appl. No.: 10/760,150

(22) Filed: Jan. 16, 2004

(65) Prior Publication Data

US 2005/0151009 A1    Jul. 14, 2005

Related U.S. Application Data

(60) Provisional application No. 60/440,726, filed on Jan. 17, 2003.

(51) Int. Cl.
*B64C 3/56*    (2006.01)

(52) U.S. Cl. .......................................... 244/49; 244/63

(58) Field of Classification Search ............ 244/63, 244/49, 131, 101, 3.27; 446/62, 61
See application file for complete search history.

(56) References Cited

U.S. PATENT DOCUMENTS

| | | | |
|---|---|---|---|
| 965,881 A | 8/1910 | Draper |
| 968,339 A | 8/1910 | Geraldson |
| 975,953 A | 11/1910 | Hourwich |
| 1,144,505 A | 6/1915 | Steffan |
| 1,164,967 A | 12/1915 | Thorp |
| 1,317,631 A | 9/1919 | Kinser |
| 1,383,595 A | 7/1921 | Black |
| 1,384,036 A | 7/1921 | Anderson |
| 1,428,163 A | 9/1922 | Harriss |
| 1,499,472 A | 7/1924 | Hazen |
| 1,530,010 A | 3/1925 | Albert |
| 1,556,348 A | 10/1925 | Ray et al. |
| 1,624,188 A | 4/1927 | Simon |
| 1,634,964 A | 7/1927 | Steinmetz |
| 1,680,473 A | 8/1928 | Parker |
| 1,686,298 A | 10/1928 | Uhl |
| 1,712,164 A | 5/1929 | Peppin |
| 1,716,670 A | 6/1929 | Sperry |
| 1,731,091 A | 10/1929 | Belleville |
| 1,737,483 A | 11/1929 | Verret |

(Continued)

FOREIGN PATENT DOCUMENTS

DE    4301671 A1    7/1993

(Continued)

OTHER PUBLICATIONS

U.S. Appl. No. 10/758,940, Dennis.

(Continued)

*Primary Examiner*—Tien Dinh
(74) *Attorney, Agent, or Firm*—Perkins Coie LLP

(57) ABSTRACT

Methods and apparatuses for launching unmanned aircraft and other flight devices or projectiles are described. In one embodiment, the aircraft can be launched from an apparatus that operates with a wedge action. A launch carriage carrying an unmanned aircraft is positioned on first and second launch members. At least one of the launch members moves relative to the other from a first position to a second position, causing the launch carriage to move from a first launch carriage position to a second launch carriage position. As the launch carriage moves, it accelerates the aircraft and releases the aircraft for takeoff.

35 Claims, 26 Drawing Sheets

U.S. PATENT DOCUMENTS

| | | | |
|---|---|---|---|
| 1,738,261 A | 12/1929 | Perkins | |
| 1,748,663 A | 2/1930 | Tucker | |
| 1,756,747 A | 4/1930 | Holland | |
| 1,777,167 A | 9/1930 | Forbes | |
| 1,836,010 A | 12/1931 | Audrain | |
| 1,842,432 A | 1/1932 | Stanton | |
| 1,869,506 A | 8/1932 | Richardson | |
| 1,892,357 A | 12/1932 | Moe | |
| 1,912,723 A | 6/1933 | Perkins | |
| 1,925,212 A | 9/1933 | Steiber | |
| 1,940,030 A | 12/1933 | Steiber | |
| 1,960,264 A | 5/1934 | Heinkel | |
| 2,333,559 A | 11/1943 | Grady et al. | |
| 2,347,561 A | 4/1944 | Howard et al. | |
| 2,360,220 A | 10/1944 | Goldman | |
| 2,364,527 A | 12/1944 | Haygood | |
| 2,365,778 A | 12/1944 | Schwab | |
| 2,365,827 A | 12/1944 | Liebert | |
| 2,380,702 A | 7/1945 | Persons | |
| 2,390,754 A | 12/1945 | Valdene | |
| 2,435,197 A | 2/1948 | Brodie | |
| 2,436,240 A | 2/1948 | Wiertz | |
| 2,448,209 A | 8/1948 | Boyer et al. | |
| 2,465,936 A | 3/1949 | Schultz | |
| 2,488,050 A | 11/1949 | Brodie | |
| 2,515,205 A | 7/1950 | Fieux | |
| 2,526,348 A | 10/1950 | Gouge | |
| 2,669,403 A | 2/1954 | Milligan | |
| 2,735,391 A | 2/1956 | Buschers | |
| 2,814,453 A | 11/1957 | Trimble et al. | |
| 2,843,342 A * | 7/1958 | Ward | 244/63 |
| 2,844,340 A | 7/1958 | Daniels et al. | |
| 2,908,240 A | 10/1959 | Hodge | |
| 2,919,871 A | 1/1960 | Sorensen | |
| 2,933,183 A | 4/1960 | Koelsch | |
| 3,069,118 A | 12/1962 | Bernard | |
| RE25,406 E | 6/1963 | Byrne et al. | |
| 3,163,380 A | 12/1964 | Brodie | |
| 3,268,090 A | 8/1966 | Wirkkala | |
| 3,454,244 A | 7/1969 | Walander | |
| 3,468,500 A | 9/1969 | Carlsson | |
| 3,484,061 A | 12/1969 | Niemkiewicz | |
| 3,516,626 A | 6/1970 | Strance et al. | |
| 3,684,219 A | 8/1972 | King | |
| 3,708,200 A | 1/1973 | Richards | |
| 3,765,625 A | 10/1973 | Myhr et al. | |
| 3,827,660 A | 8/1974 | Doolittle | |
| 3,939,988 A | 2/1976 | Wellman | |
| 3,943,657 A | 3/1976 | Leckie | |
| 3,980,259 A | 9/1976 | Greenhalgh et al. | |
| 4,067,139 A | 1/1978 | Pinkerton et al. | |
| 4,079,901 A * | 3/1978 | Mayhew et al. | 244/63 |
| 4,143,840 A | 3/1979 | Bernard et al. | |
| 4,147,317 A | 4/1979 | Mayhew et al. | |
| D256,816 S | 9/1980 | McMahon et al. | |
| 4,236,686 A | 12/1980 | Barthelme et al. | |
| 4,238,093 A * | 12/1980 | Siegel et al. | 244/63 |
| 4,279,195 A * | 7/1981 | Miller | 92/88 |
| 4,311,290 A | 1/1982 | Koper | |
| 4,408,737 A | 10/1983 | Schwaerzler | |
| 4,471,923 A | 9/1984 | Hoppner et al. | |
| 4,523,729 A | 6/1985 | Frick | |
| 4,566,658 A | 1/1986 | Di Giovanniantonio et al. | |
| 4,678,143 A * | 7/1987 | Griffin | 244/63 |
| 4,730,793 A | 3/1988 | Thurber, Jr. et al. | |
| 4,753,400 A | 6/1988 | Reuter et al. | |
| 4,809,933 A | 3/1989 | Buzby et al. | |
| 4,842,222 A | 6/1989 | Baird | |
| 4,909,458 A * | 3/1990 | Martin | 244/63 |
| 4,979,701 A | 12/1990 | Colarik et al. | |
| 5,007,875 A | 4/1991 | Dasa | |
| 5,039,034 A | 8/1991 | Burgess et al. | |
| 5,042,750 A | 8/1991 | Winter | |
| 5,054,717 A | 10/1991 | Taylor | |
| 5,109,788 A | 5/1992 | Heinzmann | |
| 5,119,935 A | 6/1992 | Stump et al. | |
| 5,253,605 A | 10/1993 | Collins | |
| 5,253,606 A | 10/1993 | Ortelli | |
| 5,509,624 A | 4/1996 | Takahashi | |
| 5,583,311 A | 12/1996 | Rieger | |
| 5,655,944 A | 8/1997 | Fusselman | |
| 5,687,930 A | 11/1997 | Wagner et al. | |
| 5,906,336 A | 5/1999 | Eckstein | |
| 6,264,140 B1 | 7/2001 | McGeer et al. | |
| 6,457,673 B1 | 10/2002 | Miller | |
| 6,478,650 B1 | 11/2002 | Tsai | |
| 2002/0100838 A1 | 8/2002 | McGeer et al. | |
| 2003/0222173 A1 | 12/2003 | McGeer et al. | |
| 2005/0133665 A1 | 6/2005 | Dennis et al. | |

FOREIGN PATENT DOCUMENTS

| | | | | |
|---|---|---|---|---|
| FR | 854371 | * | 4/1940 | 244/63 |
| GB | 2 080 216 A | | 2/1982 | |
| GB | 2150895 | * | 7/1985 | 244/63 |
| GB | 2 219 777 A | | 12/1989 | |
| JP | 07-304498 | | 11/1995 | |
| WO | WO 00/75014 A1 | | 12/2000 | |
| WO | WO 01/07318 A1 | | 2/2001 | |

OTHER PUBLICATIONS

U.S. Appl. No. 10/758,943, Dennis et al.
U.S. Appl. No. 10/758,948, Dennis et al.
U.S. Appl. No. 10/758,955, McGeer et al.
U.S. Appl. No. 10/758,956, Dennis et al.
U.S. Appl. No. 10/759,541, McGeer.
U.S. Appl. No. 10/759,545, Dennis et al.
U.S. Appl. No. 10/759,742, Dennis.
U.S. Appl. No. 10/808,725, McGeer et al.
U.S. Appl. No. 10/813,906, Roeseler.
Robinson, Russell Norman, "Dynamic Analysis of a Carousel Remotely Piloted Vehicle Recovery System," master's thesis, Naval Post-Graduate School, Monterey, California, Dec. 1977, Thesis No. ADA052401.
Dickard, H. E. "Mini-RPV Recovery System Conceptual Study," final report, U.S. Army Air Mobility Research and Development Laboratory, Fort Eustis, Virginia, Aug. 1977, Contract DAAJ02-76-C-0048, Report No. USAAMRDL-TR-77-24.
Whitmore, Stephen A. et al., "Development of a Closed-Loop Strap Down Attitude System for an Ultrahigh Altitude Flight Experiment," technical memorandum, NASA Dryden Flight Research Center, Edwards, California, Jan. 1997, Report No. NASA TM-4775.
U.S. Appl. No. 10/759,742, filed Jan. 16, 2004, Dennis.
Ames Builds Advanced Yawed-Wing RPV, Aviation Week & Space Technology, Jan. 22, 1973, pp. 73.

* cited by examiner

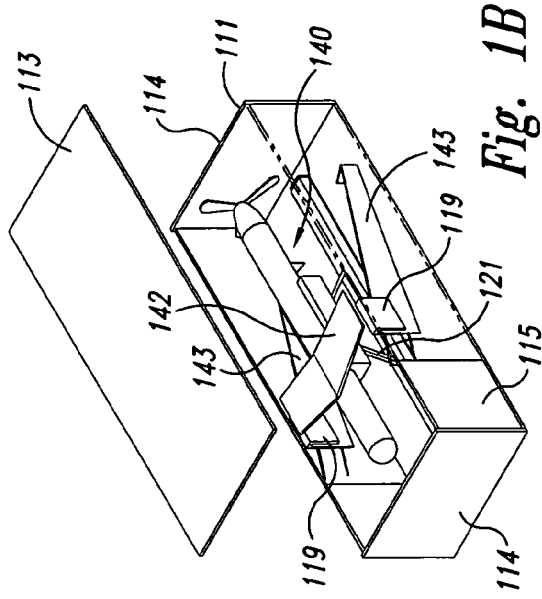
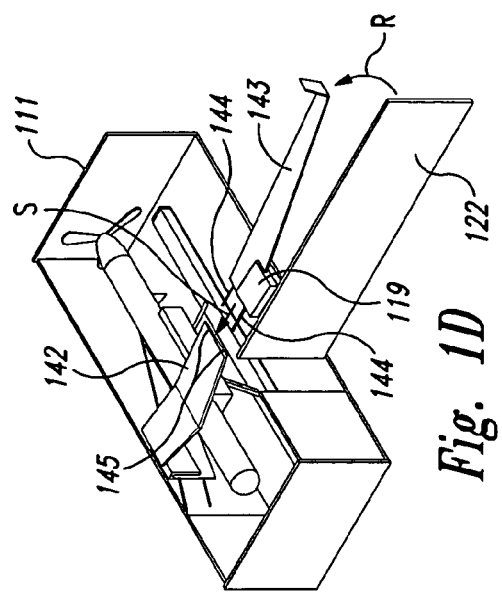
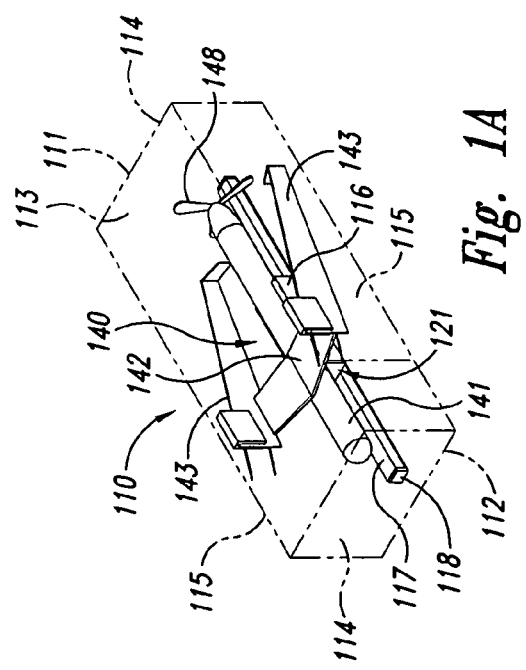
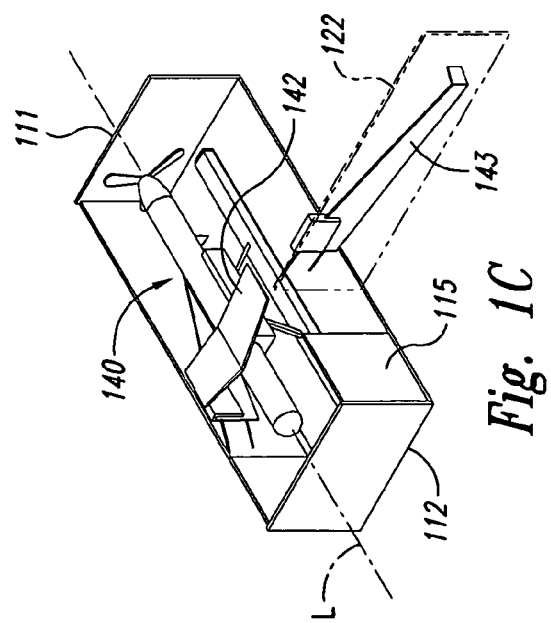

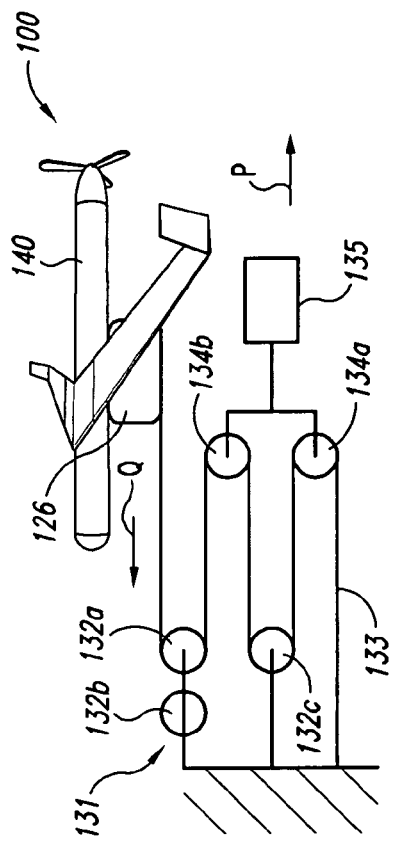
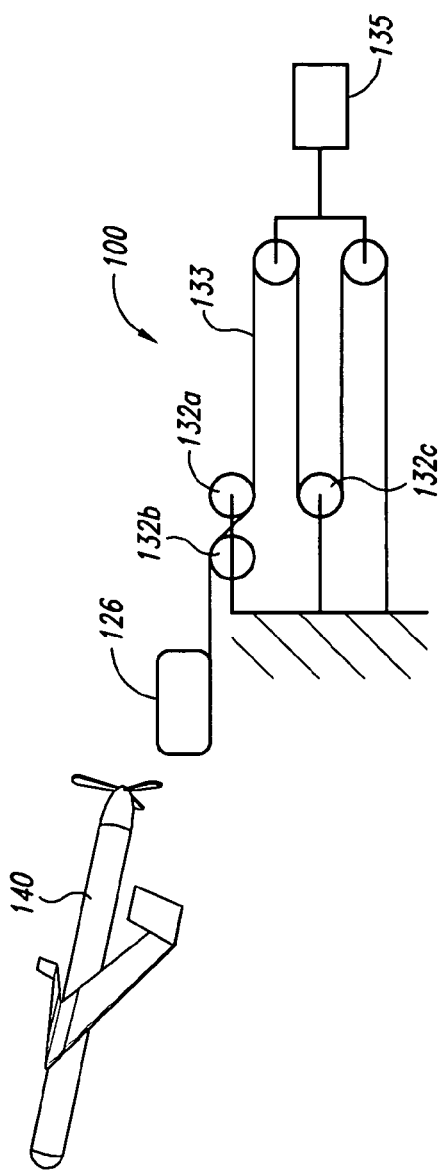
Fig. 3A
Fig. 3B

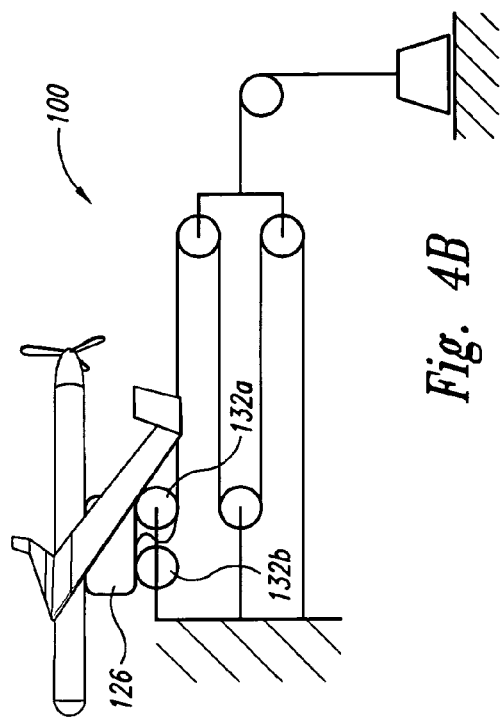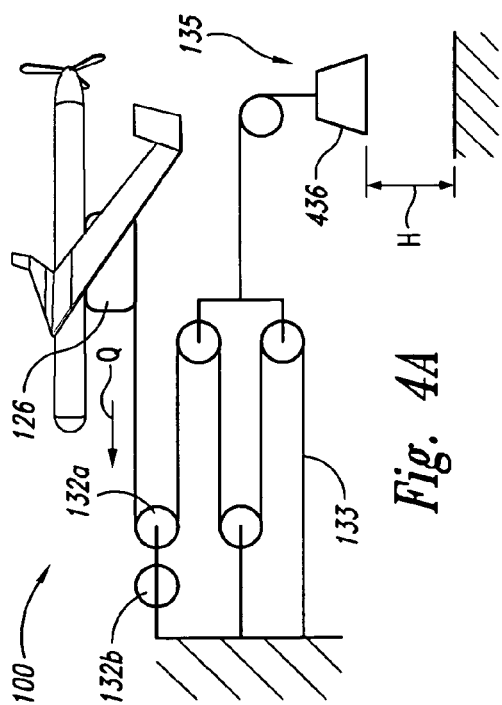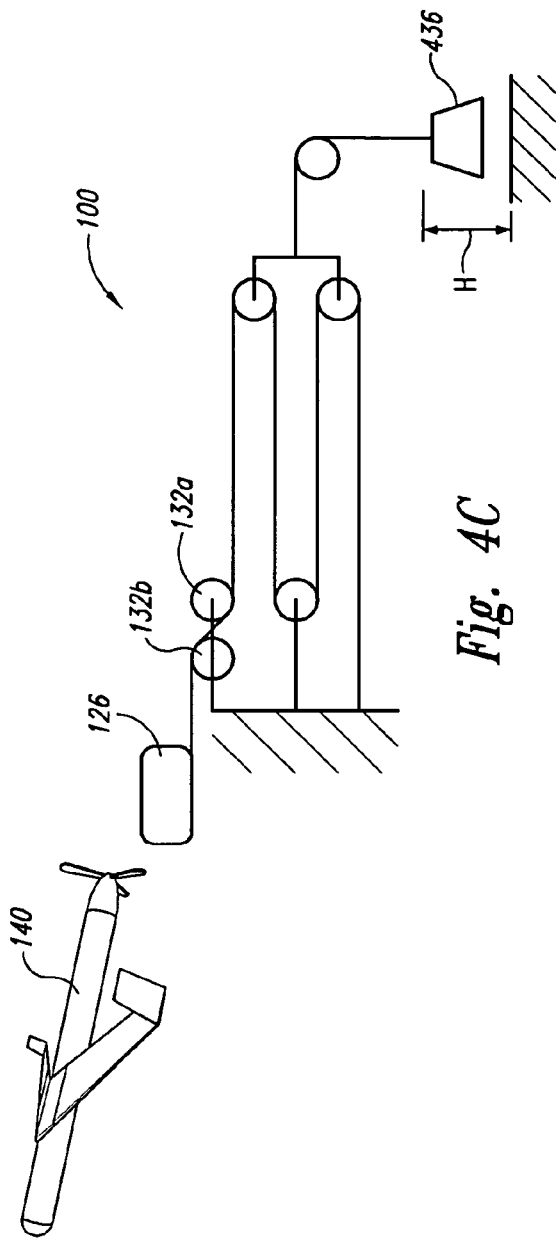
Fig. 4A
Fig. 4B
Fig. 4C

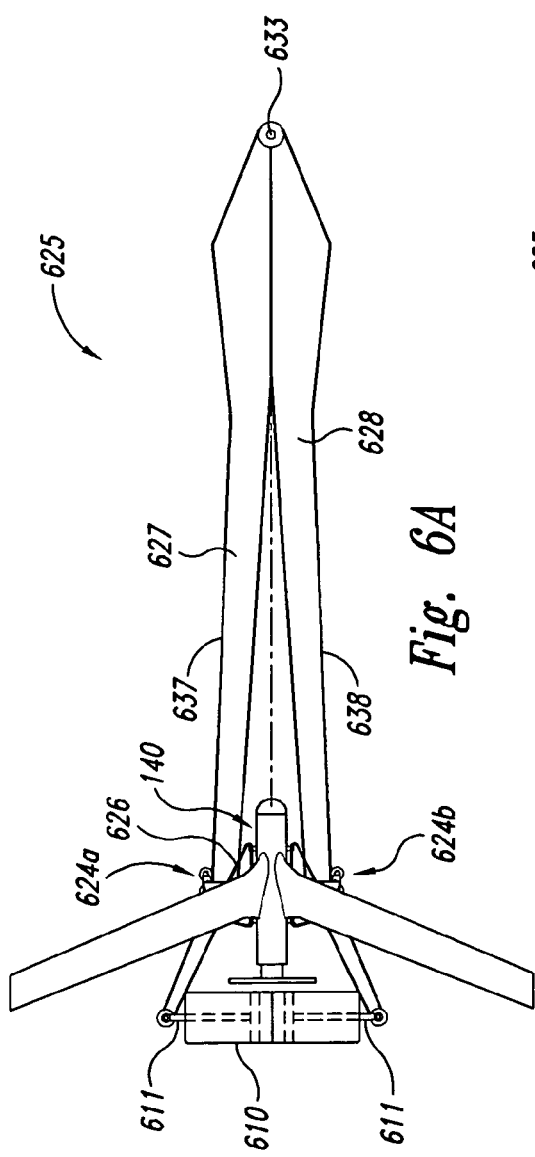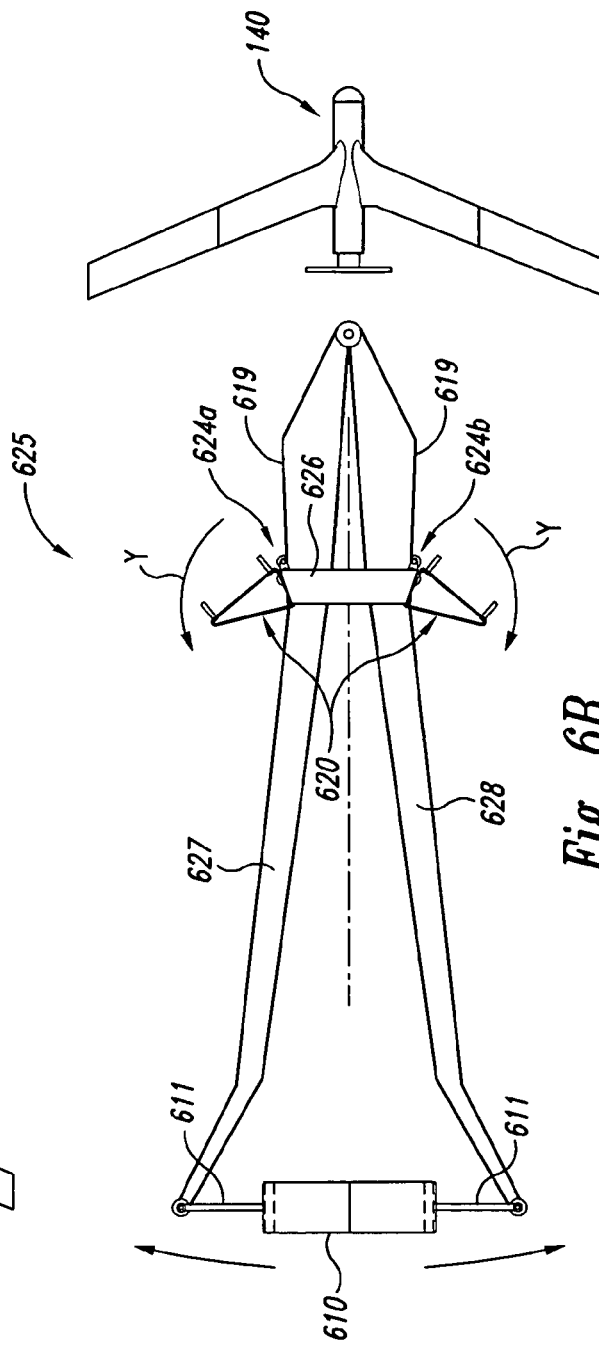

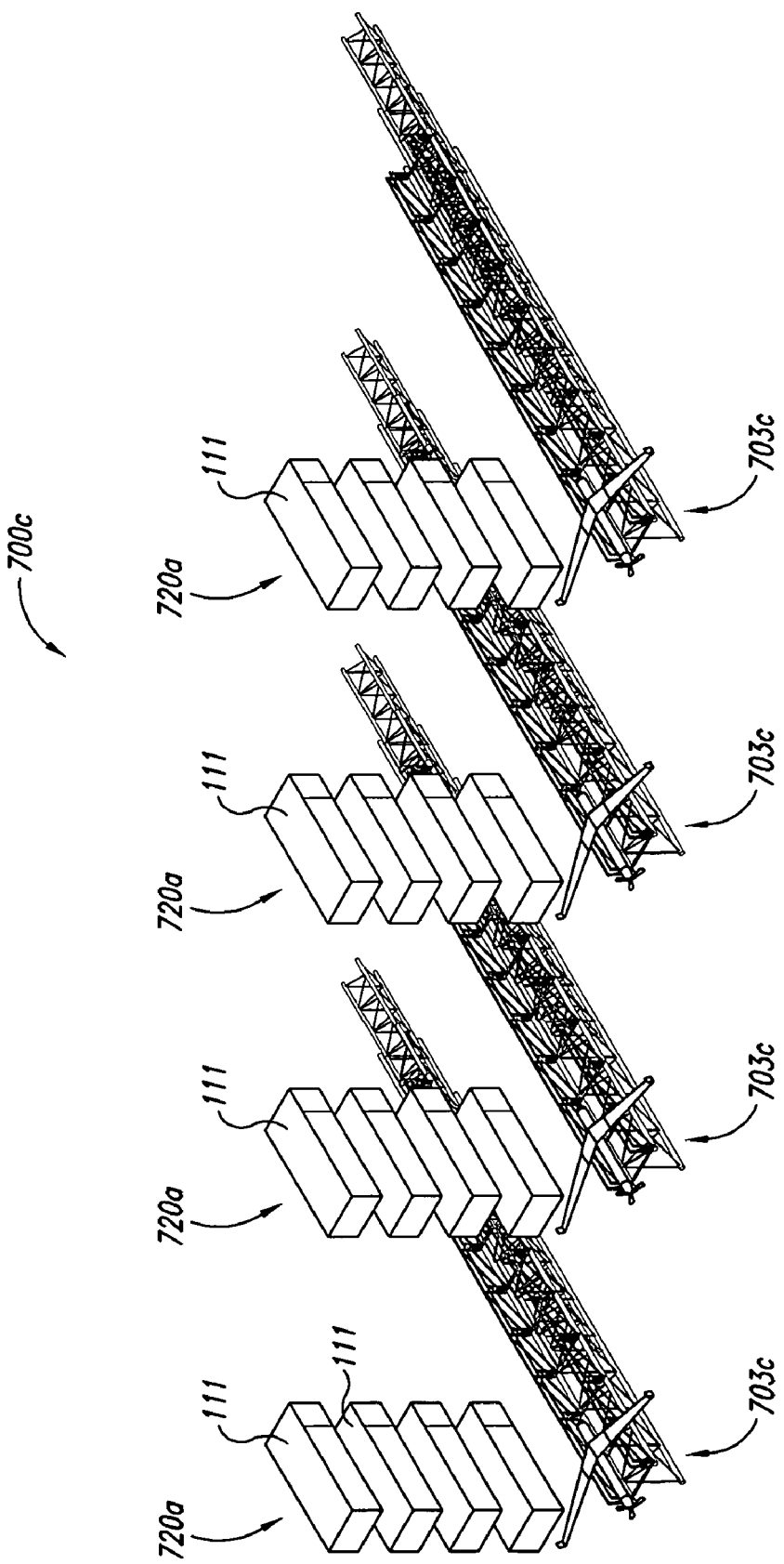

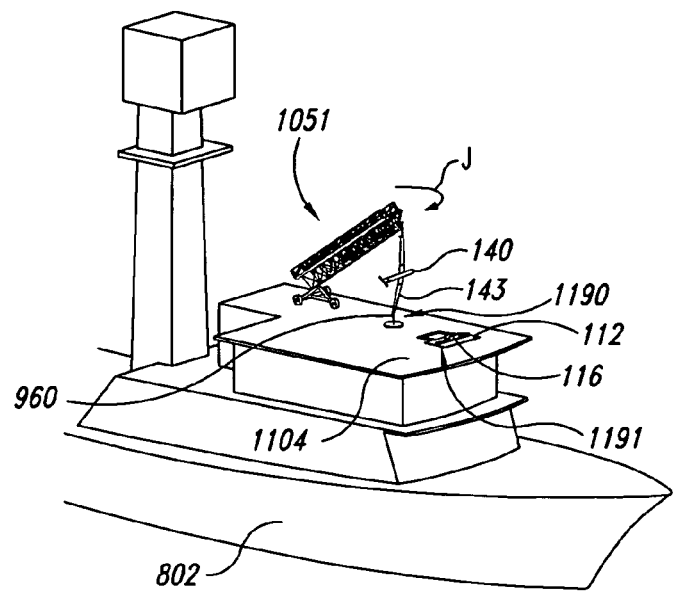
Fig. 11C
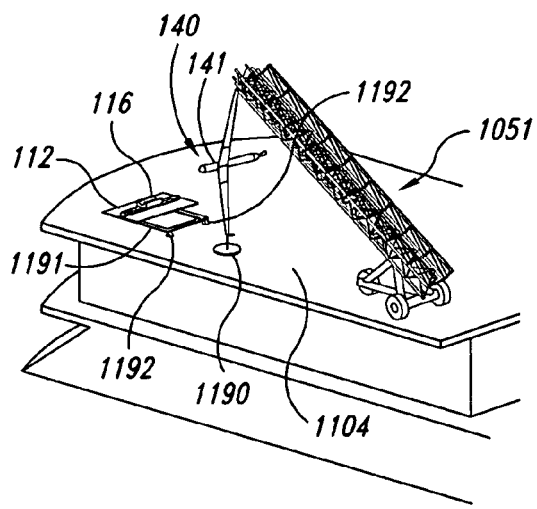     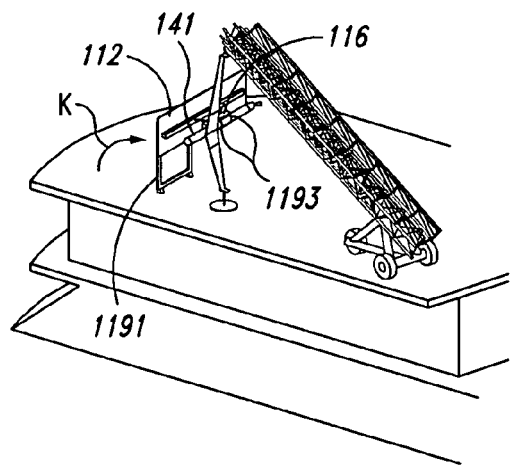
Fig. 11D              Fig. 11E

METHODS AND APPARATUSES FOR LAUNCHING UNMANNED AIRCRAFT, INCLUDING METHODS AND APPARATUSES FOR LAUNCHING AIRCRAFT WITH A WEDGE ACTION

CROSS-REFERENCE TO RELATED APPLICATION

The present application claims priority to pending U.S. Provisional Application No. 60/440,726, filed Jan. 17, 2003 and incorporated herein in its entirety by reference.

TECHNICAL FIELD

The present disclosure describes methods and apparatuses for launching unmanned aircraft, including methods and apparatuses for launching aircraft with a wedge action.

BACKGROUND

Unmanned aircraft or air vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

Existing unmanned aircraft systems suffer from a variety of drawbacks. For example, existing unmanned aircraft systems (which can include the aircraft itself along with launch devices, recovery devices, and storage devices) typically require substantial space. Accordingly, these systems can be difficult to install and operate in cramped quarters, such as the deck of a small fishing boat, land vehicle, or other craft. Another drawback with some existing unmanned aircraft is that, due to small size and low weight, they can be subjected to higher acceleration and deceleration forces than larger, manned air vehicles and can accordingly be prone to damage, particularly when manually handled during recovery and launch operations in hostile environments, such as a heaving ship deck. Yet another drawback with some existing unmanned aircraft systems is that they may not be suitable for recovering aircraft in tight quarters, without causing damage to either the aircraft or the platform from which the aircraft is launched and/or recovered.

BRIEF DESCRIPTION OF THE DRAWINGS

FIGS. 1A–1H illustrate an apparatus and process for storing and assembling an unmanned aircraft prior to launch in accordance with an embodiment of the invention.

FIGS. 3A–3B schematically illustrate an apparatus for providing acceleration to launch an unmanned aircraft, and a corresponding deceleration of parts of the apparatus, which deceleration acts as a brake.

FIGS. 4A–4C schematically illustrate one type of energy source to provide motive power to an apparatus for accelerating an unmanned aircraft and braking moving components of the apparatus in accordance with an embodiment of the invention.

FIGS. 6A–6B are partially schematic illustrations of an apparatus having a movable link for launching an unmanned aircraft in accordance with another embodiment of the invention.

FIGS. 7A–7C illustrate apparatuses for storing and/or launching multiple unmanned aircraft in accordance with yet further embodiments of the invention.

FIGS. 11A–11G are partially schematic illustrations of a system and method for securing and stowing an unmanned aircraft after capture in accordance with an embodiment of the invention.

DETAILED DESCRIPTION

The present disclosure describes unmanned aircraft and corresponding methods and apparatuses for launching and retrieving or recovering such aircraft. Included in the disclosure are methods and apparatuses for handling small unmanned aircraft in a secure and efficient cycle from flight through retrieval, dismantling, storage, servicing, assembly, checkout, launch, and back to flight. Many specific details of certain embodiments of the invention are set forth in the following description and in FIGS. 1A–13F to provide a thorough understanding of these embodiments. One skilled in the art, however, will understand that the present invention may have additional embodiments, and that the invention may be practiced without several of the details described below. For example, many of the aspects described below in the context of launching, recovering, and storing unmanned aircraft may be applicable as well to other self-propelled and/or projectile airborne devices.

In particular embodiments, aspects of the invention can enable and improve handling of unmanned aircraft from retrieval to launch. They address the problem of vulnerability to damage during manual handling and storage, retrieval, and launch aboard ship or in a similarly confined space, and efficient operation of multiple aircraft. Components of the invention can be used individually or together in a secure and efficient handling cycle. Aspects of the apparatuses and methods can include (1) compact storage; and (2) constrained motion. Accordingly, embodiments of the system can discourage freehanding of the unprotected aircraft, whole or in pieces, and instead can include provisions for dismantling, packing, and assembling the aircraft along prescribed paths, with the storage apparatus and its interfaces with the launch and retrieval apparatus shielding the aircraft from abuse.

The following description includes four sections, each focused on a particular aspect of unmanned aircraft operation. Section 1 focuses on methods and apparatuses for assembling unmanned aircraft, Section 2 focuses on methods and apparatuses for launching unmanned aircraft, Section 3 focuses on methods and apparatuses for retrieving unmanned aircraft, and Section 4 focuses on methods and apparatuses for disassembling and stowing unmanned aircraft. Each of the following Sections describes several embodiments of the corresponding structures and methods that are the focus of that Section. Overall systems in accordance with other embodiments of the invention can include any of a wide variety of combinations and variations of the following embodiments.

1. Aircraft Assembly

Figure 1E:
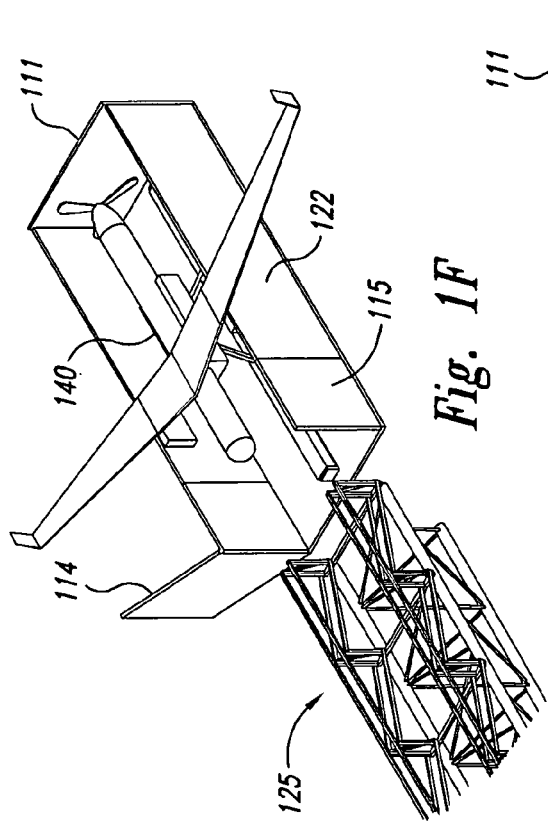
Figure 1F:
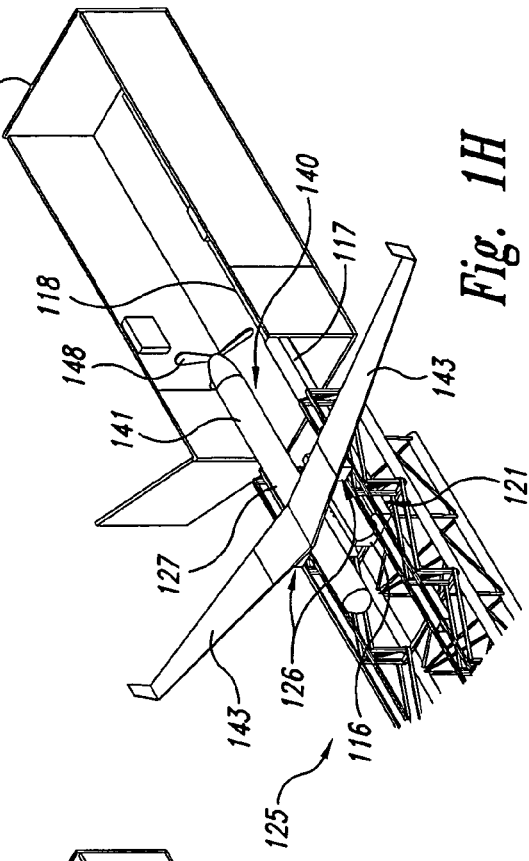
Figure 1G:
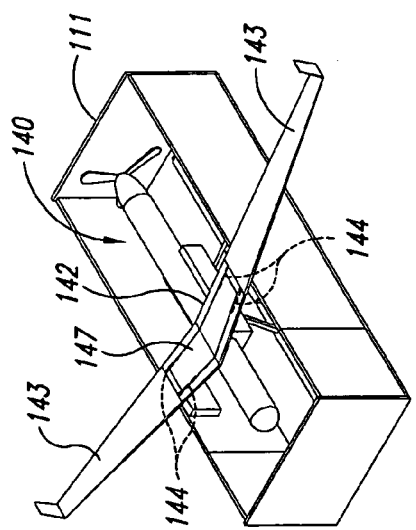

FIGS. 1A–1H illustrate a method and apparatus for storing and assembling an unmanned aircraft prior to launch, in accordance with an embodiment of the invention. In anticipation of launch, a closed storage container as shown in FIG. 1A can be secured to a launch apparatus as shown in FIG. 1G, thereby establishing a secure workstand for assembly, and a path for constrained motion of the aircraft onto the launcher.

Beginning with FIG. 1A, a stowage system 110 in accordance with one aspect of this embodiment can include a container 111 (shown in phantom lines in FIG. 1A) having one or more movable panels defining a volume in which an unmanned aircraft 140 is stowed. The aircraft 140 can be carried on an aircraft support member, which can include a cradle 116, which is in turn supported by a movable dolly or car 117. The car 117 can be mounted on a rail 118 or another controlled motion system for movement relative to the container 111, as described in greater detail below with reference to FIG. 1G. In one aspect of this embodiment, the cradle 116 can be mounted to the car 117 with a jack 121 to move the aircraft 140 vertically relative to the container 111, as described in greater detail below with reference to FIG. 1B.

The container 111 can have a generally box-like shape and can include a bottom 112 (which supports the rail 118), opposing ends 114 extending upwardly from the bottom 112, and sides 115 positioned between the opposing ends 114. A removable top 113 can seal the aircraft 140 within the container 111. In one embodiment, the aircraft 140 can include a fuselage 141, an aft-mounted propeller 148, and a wing stub 142. Wings 143 can be stowed against the sides 115 of the container 111 and can be attached to the wing stub 142 as described in greater detail below with reference to FIGS. 1B–1E. In other embodiments, the aircraft 140 can have other configurations when stowed.

Referring now to FIG. 1B, the jack 121 can be activated to elevate the aircraft 140 relative to the container 111. For example, in one embodiment, the aircraft 140 can be elevated at least until the wing stub 142 is positioned above the upper edges of the container sides 115. With the wing stub 142 in this position, the wings 143 can be aligned for attachment to the aircraft 140. Each wing 143 can have a wing gripper 119 attached to it. As described in greater detail below, the wing grippers 119 can eliminate the need for the operator (not shown in FIGS. 1A–1H) to have direct manual contact with the wings 143 during wing assembly.

Referring now to FIG. 1C, a section 122 of one of the container sides 115 can be pivoted outwardly from the container 111 and slid aft, parallel to a longitudinal axis L of the aircraft 140. This motion can position a corresponding one of the wings 143 proximate to the wing stub 142. In one aspect of this embodiment, the degrees to which the section 122 pivots outwardly and slides longitudinally are controlled by stops (not visible in FIG. 1C) positioned in the bottom 112 of the container 111. Accordingly, the stops can orient the wing 143 for attachment to the wing stub 142 with precision. The overall motion of the section 122 relative to the container 111 is constrained by a guide structure (e.g., a pin of the section 122 received in a slot of the container). Accordingly, the section 122 moves along a constrained, section guide path.

Referring now to FIG. 1D, the wing 143 can be rotated upwardly (as indicated by arrow R) until forward and aft spars 144 of the wing 143 are aligned with corresponding spar receptacles 145 in the wing stub 142. In one aspect of this embodiment, the operator can rotate the wing 143 by engaging only the wing gripper 119, reducing the likelihood for contaminating the wing surfaces with debris and/or damaging the wing surfaces. Once the spars 144 are aligned with the corresponding spar receptacles 145, the operator can slide the wing gripper 119 along a track located on the inner surface of the section 122 of the container 111 to insert the spars 144 into the corresponding spar receptacles 145, as indicated by arrow S. Accordingly, the motion of the wing gripper 119 is constrained to be along a gripper guide path. For purposes of illustration, communication lines (such as electrical cables) which run between the fuselage 141 and the wing 143 are not shown in FIG. 1D. These lines can include sufficient extra length to allow the wing 143 to be moved toward and away from the fuselage 141 during assembly and disassembly, and take-up devices such as reels or spring-loaded loops to adjust the lines appropriately.

Referring now to FIG. 1E, the operator can lock the wing 143 relative to the wing stub 142 by removing a hatch 147 from the wing stub 142 and inserting wing retainers (not visible in FIG. 1E) which lock the spars 144 in firm engagement with the wing stub 142. The process described above with reference to FIGS. 1B–1E can then be repeated for the other wing 143 to fully assemble the aircraft 140 in preparation for launch. While the aircraft 140 is carried on the cradle 116, it can be serviced. For example, the aircraft 140 can be fueled and/or electrically powered prior to flight, de-fueled and/or powered down after flight, and can receive/transmit data before and/or after flight.

FIG. 1F shows the container 111 with the fully assembled aircraft 140 positioned in preparation for a controlled transfer of the aircraft 140 onto a launch system 125. In one embodiment, the forward end 114 of the container 111 can then be removed or pivoted out of the way to allow the aircraft 140 to slide onto the launch system 125, as described below with reference to FIG. 1G.

In one embodiment (shown in FIG. 1G), an operator or motorized device can slide the car 117, the cradle 116, and the aircraft 140 (as a unit) relative to the rail 118 to position the aircraft 140 on the launch system 125. In other embodiments, the container 111 can include other arrangements for moving the aircraft 140 into position for launch via the launch system 125. In any of these embodiments, the aircraft 140 can be moved from the container 111 to the launch system 125 without unconstrained motion or manual handling of the aircraft 140. For example, an operator can move the car 117 by grasping or engaging the cradle 116 or the car 117 rather than the aircraft 140. In another embodiment, all of the motions made after securing the storage container to the launch apparatus can be fully automated.

Figure 1H:
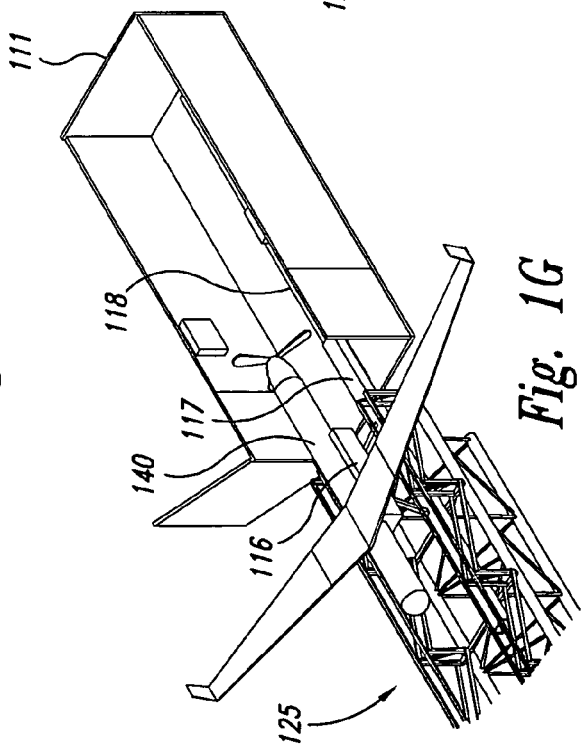

As shown in FIG. 1H, the launch system 125 can include a launch carriage 126 which is moved into position to receive the aircraft 140 from the cradle 116. The launch carriage 126 can releasably support the wings 143 (as shown in FIG. 1H) or the fuselage 141, or other portions of the aircraft 140 during launch. In any of these embodiments, once the aircraft 140 is supported by the launch carriage 126, the operator can retract the cradle 116 downwardly by activating the jack 121. The operator can then slide the car 117, with the retracted cradle 116, back along the rail 118 into the container 111. The container 111 can then be moved away from the launch system 125 so as not to interfere with the propeller 148 or any other portion of the aircraft 140.

2. Aircraft Launch

Figure 2:
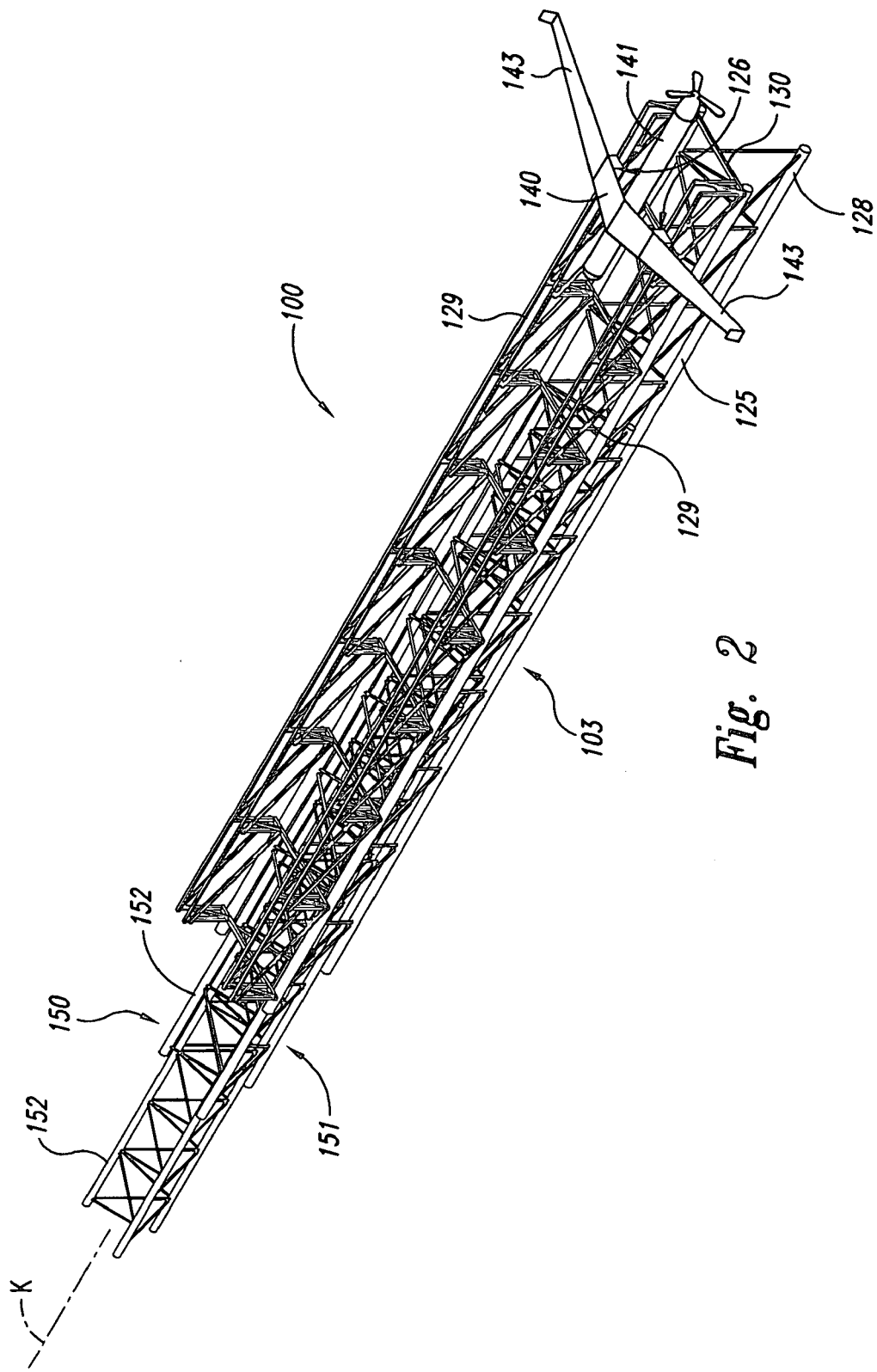
FIG. 2 is a partially schematic illustration of an apparatus configured to both launch and recover an unmanned aircraft in accordance with an embodiment of the invention.

FIG. 2 is a partially schematic, rear isometric illustration of an apparatus 100 that includes the aircraft 140 positioned on an aircraft handling system 103. The aircraft handling system 103 can include an embodiment of the launch system 125 (described briefly above) configured to launch the aircraft 140, and a recovery system 150 configured to recover the same aircraft 140 at the end of its flight.

In one aspect of an embodiment shown in FIG. 2, the launch system 125 can include a launch support member 128 that carries a launch track 130 having two launch rails 129. The launch system 125 can further include a launch carriage 126, such as that described above with reference to FIG. 1H. In one embodiment, the launch carriage 126 can include two independent components, each of which supports one of the wings 143 and each of which travels along one of the launch rails 129. In other embodiments, the launch carriage 126 can include a generally unitary structure that supports both wings 143 and travels along both launch rails 129. In still further embodiments, the launch carriage 126 can support other portions of the aircraft 140, such as the fuselage 141. In yet another embodiment, only one launch rail can support the launch carriage 126. In any of these embodiments, the carriage 126 can be propelled along the launch track 130 to launch the aircraft 140, as described below with reference to FIGS. 4A–6F.

In another aspect of an embodiment of the apparatus shown in FIG. 2, the recovery system 150 can be integrated with the launch system 125 to reduce the overall volume occupied by these two systems. For example, in one particular embodiment, the recovery system 150 can include an extendable (and retractable) boom 151 having a plurality of nested segments 152. An operator can extend the nested segments 152 along a launch axis K defined by the launch track 130 to retrieve the aircraft 140 after its flight. Further details of embodiments of the extendable boom 151 and its operation are described below with reference to FIGS. 11A–11G.

FIG. 3A is a partially schematic, side elevational view of a portion of the apparatus 100 described above with reference to FIG. 2, illustrating an energy reservoir 135 that provides power to and receives power from the launch carriage 126. Accordingly, the energy reservoir 135 can accelerate the launch carriage 126 to launch the aircraft 140 and then absorb the kinetic energy of the launch carriage 126 to slow it down. In one aspect of this embodiment, the energy reservoir 135 can include a hydraulic cylinder, a spring, a pneumatic cylinder, an electric motor, a flywheel, a steam-powered apparatus, an explosive charge, and/or a weight (as described below with respect to FIGS. 4A–4C). In another aspect of this embodiment, the energy reservoir 135 is coupled to the launch carriage 126 with a transmission 131. In a further aspect of this embodiment, the transmission 131 can include a cable 133, a plurality of fixed pulleys 132 (shown as first, second, and third fixed pulleys 132a–c, respectively) and a plurality of traveling pulleys 134 (shown as first and second traveling pulleys 134a–b, respectively) arranged in a block and tackle configuration. When the energy reservoir 135 moves the traveling pulleys 134 aft (as indicated by arrow P), the carriage 126 and the aircraft 140 accelerate and move forward (as indicated by arrow Q). In one aspect of this embodiment, the energy reservoir 135 can be configured to provide a relatively high force with a relatively low acceleration over a relatively short distance, and the transmission 131 can provide to the carriage 126 a relatively smaller force with a relatively higher acceleration over a relatively longer distance. For example, in one aspect of an embodiment shown in FIG. 3A, the acceleration at the carriage 126 can be about four times the acceleration of the traveling pulleys 134. In other embodiments, the apparatus 100 can include other block and tackle configurations or other transmissions 131 that provide the same or different acceleration levels to the carriage 126. In any of these embodiments, the energy reservoir 135 and the transmission 131 can be tailored to the aerodynamic characteristics of the aircraft 140 to provide the aircraft 140 with an adequate takeoff velocity.

FIG. 3B schematically illustrates the apparatus 100 with the energy reservoir 135 activated to move the carriage 126 from a position aft of the fixed pulleys 132 to a position forward of the fixed pulleys 132. As the carriage 126 passes the first fixed pulley 132a and the cable 133 begins to engage the second fixed pulley 132b, the carriage 126 rapidly decelerates. At the same time, the aircraft 140 continues forward to lift off the carriage 126 and become airborne.

As the carriage 126 passes the first fixed pulley 132a, it also begins to exert a force on the energy reservoir 135 via the cable 133. One effect of this coupling between the carriage 126 and the energy reservoir 135 is that the carriage 126 rapidly decelerates. Accordingly, the apparatus 100 need not accommodate a long post-launch travel distance for the carriage 126. As a result, the apparatus 100 can be more compact than some existing launch/recovery devices. Another effect is that the energy associated with decelerating the carriage 126 can be reversibly absorbed by the energy reservoir 135. Accordingly, the energy reservoir 135 can be returned partially to its pre-launch state and can accordingly be closer to a state of readiness for the next launch.

FIGS. 4A–4C schematically illustrate a particular embodiment of the apparatus 100 for which the energy reservoir 135 includes a weight 436. Prior to launch, the weight 436 is positioned as shown in FIG. 4A so that it has an available potential energy determined by a height H. The weight is then released, accelerating the aircraft 140, as indicated by arrow Q. The acceleration provided by the falling weight 436 is completed when the weight 436 reaches its lower limit. Just before the weight 436 reaches its lower limit, the cable 133 passes from the first fixed pulley 132a to the second fixed pulley 132b, as shown in FIG. 4B, which reverses the accelerating force on the carriage 126. The carriage 126 immediately begins to decelerate, as shown in FIG. 4C, releasing the aircraft 140 into flight. As the carriage 126 continues for some distance beyond the second fixed pulley 132b, it raises the weight 436 by some fraction of the height H. Prior to a subsequent launch operation, the weight 436 can be raised completely to the height H, and the carriage 126 can be moved to the position shown in FIG. 4A for another launch.

One feature of embodiments of the apparatus 100 described above with reference to FIGS. 3A–4C is that the energy provided by the energy reservoir 135 can accelerate the aircraft 140 at a rapid rate. Accordingly, the aircraft 140 can be accelerated to its lift-off speed without requiring a lengthy takeoff run. An advantage of this feature is that the apparatus 100 can be compact and suitable for operation in cramped quarters.

Another feature of an embodiment of the apparatus described above with reference to FIGS. 3A–4C is that the energy reservoir 135 can be configured to absorb energy from the carriage 126 after the carriage 126 has released the aircraft 140. In some cases, as described above, the energy reservoir 135 can reversibly regain a portion of the energy required to conduct a subsequent launch. An advantage of this feature is that the time and energy required to ready the apparatus 100 for a subsequent launch can be reduced. A further advantage of this arrangement is that the apparatus 100 does not require a braking device separate from the energy reservoir 135.

FIGS. 5A–6F illustrate launch systems configured in accordance with further embodiments of the invention. Beginning with FIG. 5A, a launch system 525 in accordance with one embodiment of the invention can include a base 530 carrying two or more supports 529 (shown in FIG. 5A as a first support 529a and a second support 529b). The base 530 can be configured to incline relative to the ground (for example, with a jack 539) to orient the aircraft 140 for launch. The base 530 can be mounted to a vehicle, including a trailer or a boat, or to a fixed platform, including a building.

The launch system 525 can further include a first member 527 (e.g., a first launch member 527) and a second member 528 (e.g., a second launch member 528), both of which support a carriage 526, which in turn carries the aircraft 140 via a releasable gripper 520. At least one of the first member 527 and the second member 528 is movable relative to the other. For example, in one embodiment, the first member 527 can be fixed relative to the base 530, and the second member 528 can be movable relative to the base 530. In other embodiments, the first and second members 527, 528 can have different arrangements. In any of these embodiments, the movement of at least one of the first and second members 527, 528 can accelerate the carriage 526 to launch the aircraft 140, as described in greater detail below.

In one embodiment, the second member 528 can translate and/or rotate relative to the first member 527. In a particular aspect of this embodiment, the motion of the second member 528 relative to the first member 527 can be controlled by a pin 532, which depends from the second member 528 and which is received in an elongated guide slot 531 of the support 529b. The motion of the second member 528 can be further controlled by a block and tackle 533. In one embodiment, the block and tackle 533 can include a coupling line 535 attached to the second member 528 at a first line attachment point 536a. The coupling line 535 passes through a series of pulleys 534a–e to a second attachment point 536b, also on the second member 528. In other embodiments, the second member 528 can be supported relative to the first member 527 in other arrangements.

In any of the embodiments described above, the carriage 526 can engage both the first member 527 and the second member 528. For example, in one embodiment, the first member 527 can include a first roller surface 537 (which engages first wheels 524a of the carriage 526), and the second member 528 can include a second roller surface 538 (which engages second wheels 524b of the carriage 526). Carriage arms or links 523 can support the second wheels 524b relative to the first wheels 524a.

Figure 5A:
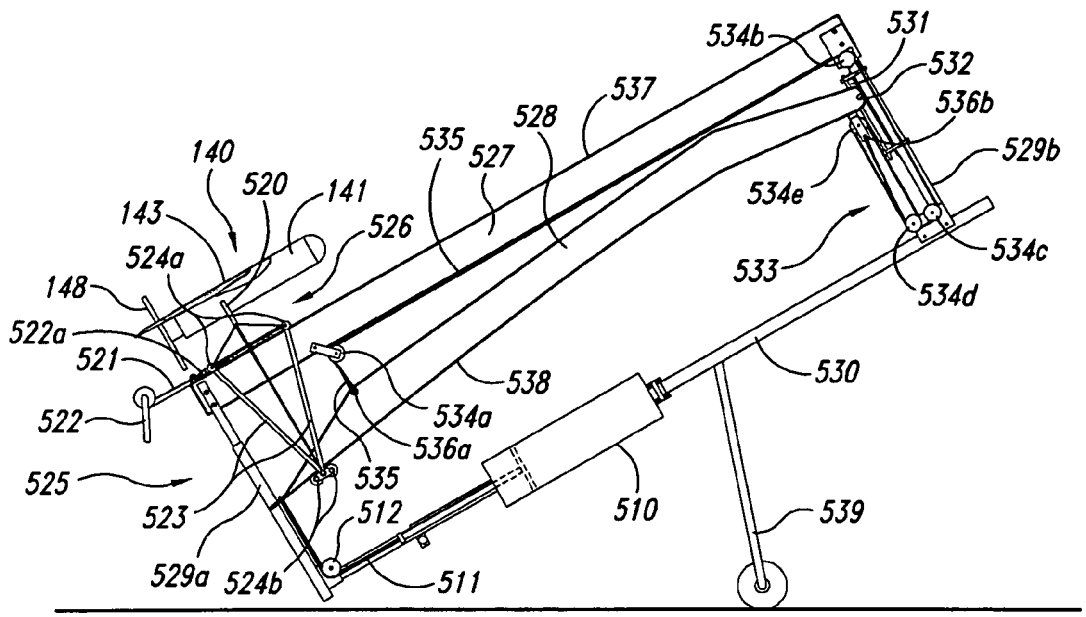
FIGS. 5A–5E are partially schematic illustrations of an apparatus having at least one movable link for launching an unmanned aircraft in accordance with another embodiment of the invention.

In one embodiment, the second roller surface 538 can have a curved profile to control the acceleration of the carriage 526. In other embodiments, the second roller surface 538 can have other shapes. In any of these embodiments, the carriage 526 can travel (from left to right as shown in FIG. 5A) along the first roller surface 537 while engaging the second surface roller surface 538. In a particular aspect of this embodiment, the second roller surface 538 an be inclined relative to the first roller surface 537 and can move in a wedge fashion, so as to force the carriage 526 from left to right to launch the aircraft 140.

In one embodiment, the force required to move the second member 528 relative to the first member 527 can be provided by an actuator 510. The actuator can be coupled with an actuator line 511 to the second member 528, after passing around an actuator pulley 512. In one aspect of this embodiment, the actuator 510 can include a compressed gas cylinder, having a piston that retracts the actuator line 511 to draw the second member 528 downwardly away from the first member 527, as described in greater detail below with reference to FIG. 5B. In other embodiments, the actuator 510 can have other arrangements, such as a hydraulic cylinder, a bungee, or a spring. In any of these embodiments, the actuator 510 can move the second member 528 relative to the first member 527, forcing movement of the carriage 526 from left to right.

The launch system 525 can include a carriage return crank or winch 522 having a carriage return line 521 with a releasable trigger 522a connected to the carriage 526. The launch carriage 526 is held back in a pre-launch position by the carriage return line 521 while a launch force is applied to the launch carriage 526. The releasable trigger 522a is then disengaged, allowing the launch carriage 526 to accelerate. The carriage return line 521 can be used to reset the carriage 526 after launch, as described in greater detail below with reference to FIG. 5B.

Figure 5B:
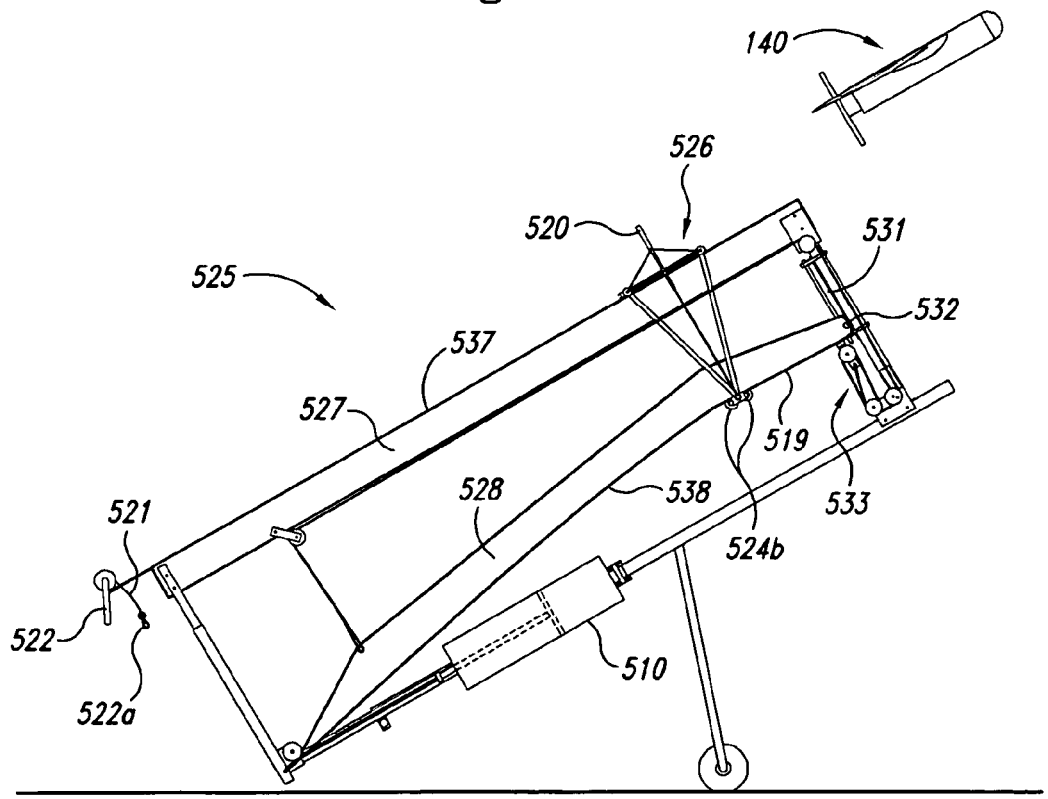

FIG. 5B illustrates the launch system 525 after the carriage 526 has been accelerated to launch the aircraft 140. In one aspect of this embodiment, the actuator 510 has rapidly drawn the second member 528 downwardly in a manner controlled by the block and tackle 533 and the pin 532 positioned in the slot 531. As the second member 528 moves downwardly relative to the first member 527, the carriage 526 is forced from left to right at a high rate of speed, until the second wheels 524b engage a braking portion 519 of the second roller surface 538. Accordingly, the angle between the second roller surface 538 and the first roller surface 537 changes at the braking portion 519. At this point, the carriage 526 rapidly decelerates, while the gripper 520 releases, allowing the aircraft 140 to continue forward as it is launched into flight.

Once the actuator 510 has moved the second member 528, it can be effectively decoupled while an operator couples the carriage return line 521 to the launch carriage and activates the carriage return crank 522 to return the carriage 526 to the position shown in FIG. 5A. For example, when the actuator 510 includes a gas powered piston, the volume of the cylinder in which the piston moves can be opened to atmospheric pressure so that the operator does not need to compress the air within the cylinder when returning the carriage 526 to the launch position. Once the carriage 526 has been returned to the position shown in FIG. 5A, the actuator 510 can be readied for the next launch, for example, by charging the cylinder in which the piston operates with a compressed gas. In other embodiments, the energy of deceleration can be used to reversibly regain energy to be used during the next launch. In still further embodiments, the actuator 510 can be recharged by the carriage return crank 522. As the carriage return crank 522 is actuated, it can force the second member 528 to its original position as the carriage 526 returns. This movement can also force the piston on the actuator 510 to its starting position and restore gas pressure in the actuator 510.

Figure 5C:
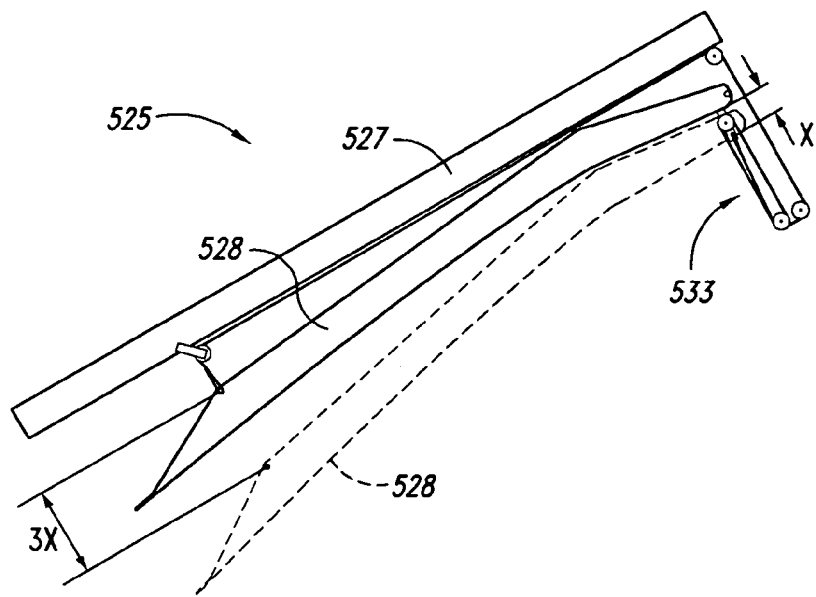

FIG. 5C is a partially schematic illustration of a portion of the launch system 525 illustrating the first member 527, along with the second member 528 (shown in its pre-launch configuration in solid lines and in its post-launch configuration in dashed lines). As shown in FIG. 5C, the portion of the second member 528 to which the coupling line 535 is attached can move by distance 3X, which is three times the distance X moved by the right most portion of the second member 528. The wedge angle between the first member 527 and the second member 528 increases by translating and pivoting the second member 528 relative to the first member 527. By increasing the wedge angle during the launch process, the carriage 526 is accelerated at a constant or nearly constant rate, even as the force from the actuator decreases near the end of the actuator's power stroke.

Figure 5D:
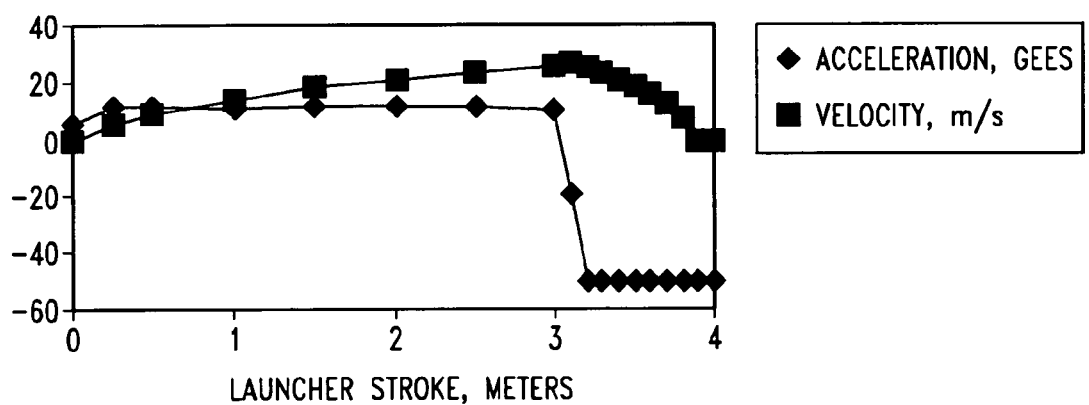

FIG. 5D is a graph illustrating predicted acceleration and velocity values for a carriage 526 propelled by a launch system 525 in accordance with an embodiment of the invention. In one aspect of this embodiment, the launch system 525 can provide a generally constant acceleration to the carriage 526, which instantaneously reverses (when the carriage 526 reaches the braking portion 519 described above). This acceleration profile can provide a generally uniform increase in velocity, as is also shown in FIG. 5D, up to at least the take-off velocity of the aircraft 140. In other embodiments, the carriage 526 can be propelled in manners that result in different acceleration and velocity profiles.

Figure 5E:
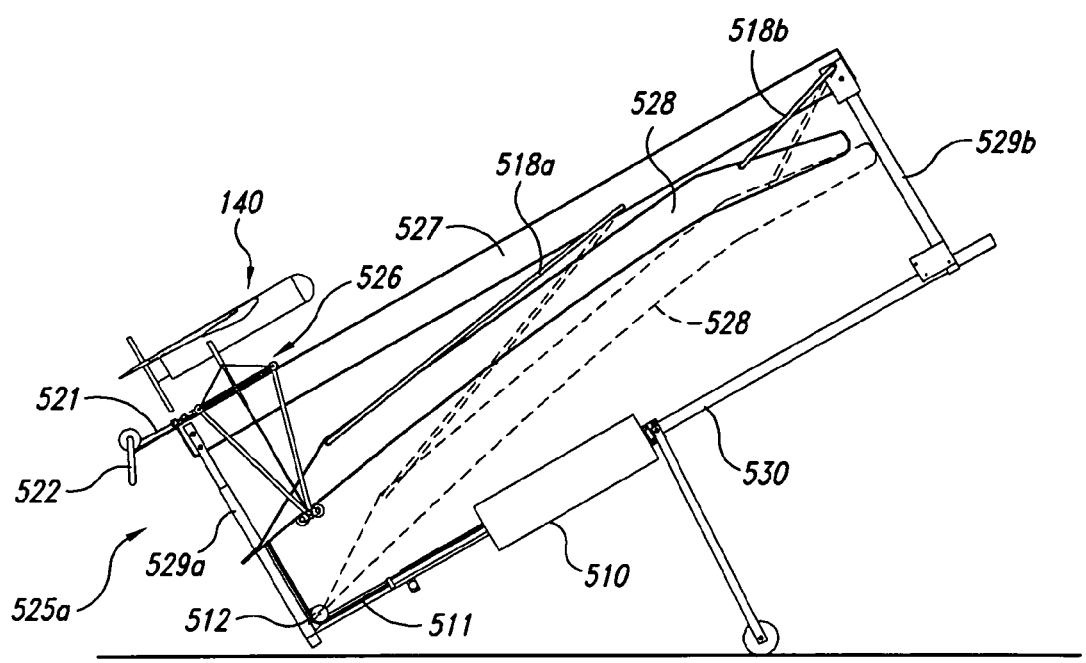

FIG. 5E is a partially schematic illustration of a launch system 525*a* configured in accordance with another embodiment of the invention and having many characteristics in common with the launch system 525 described above with reference to FIGS. 5A–5C. In one aspect of this embodiment, the launch system 525*a* includes a first link 518*a* and a second link 518*b* coupled between the first member 527 and the second member 528, in lieu of the block and tackle 533 and pin 532 arrangement described above. The motion of the second member 528 relative to the first member 527 can be generally similar to that described above with reference to FIGS. 5A and 5B, to provide acceleration and velocity profiles generally similar to those described above with reference to FIG. 5D.

FIGS. 6A–6B illustrate a launch system 625 configured in accordance with still another embodiment of the invention. In one aspect of this embodiment, the launch system 625 can include a first member 627 coupled to a second member 628 at a pivot point 633. An actuator 610 can be coupled to the first member 627 and the second member 628 with actuator rods 611 to force the first and second members 627, 628 apart from each other in a transverse plane. A carriage 626 can carry the aircraft 140 and can engage a first roller surface 637 of the first member 627 with first wheels 624*a*. The carriage 626 can also engage a second roller surface 638 of the second member 628 with second wheels 624*b*.

Referring now to FIG. 6B, the actuator 610 can be activated to spread the first member 627 and the second member 628 apart from each other, forcing the carriage 626 from left to right. When the carriage 626 reaches braking portions 619 of the first and second members 627, 628, it rapidly decelerates, causing a gripper 620 to open (as indicated by arrows Y) while the aircraft 140 continues forward and is launched into flight. In other embodiments, the launch system 625 can have other arrangements.

One feature of embodiments of the launch systems described above with reference to FIG. 5A–6B is that the "wedge action" of the first and second members relative to each other can rapidly accelerate the carriage (and therefore the aircraft 140) in a relatively short distance. An advantage of this arrangement is that the launch systems can be used in cramped quarters, including the deck of a fishing vessel or a towed trailer.

Another feature of embodiments of the launch systems described above is that the wedge angle between the first and second members can increase as they move relative to one another. This arrangement can provide a constant or nearly constant acceleration to the carriage (and the aircraft 140), even if the force provided by the actuator decreases near the end of the actuator's power stroke. An advantage of this arrangement is that the aircraft 140 is less likely to be subject to sudden changes in acceleration, which can damage the aircraft 140.

Yet another feature of the launch systems described above with reference to FIGS. 5A–6B is that at least one of the first and second members can include a braking portion which rapidly and safely decelerates the carriage carried by the launch system. An advantage of this feature is that the rail length required for deceleration can be short relative to that for acceleration, and the overall length of the system can be correspondingly limited. Further details of the manner in which the carriage releases the aircraft are described below with reference to FIGS. 6C–6F.

Another feature of the launch systems described above with reference to FIGS. 5A–6B is that the number of components that move at high speed during the launch process is relatively small. For example, in a particular embodiment, the only rolling elements that are traveling at high speed are the carriage wheels, and no high speed pulleys are included. Accordingly, the potential losses associated with components moving at high speed, including losses caused by ropes attached to the carriage suddenly accelerating and decelerating (e.g., "rope slurping") can be reduced and/or eliminated.

FIGS. 6C–6F illustrate an arrangement for supporting the aircraft 140 during launch, suitable for use with any of the launch systems described above. In one embodiment, shown in FIG. 6C, the arrangement can include a carriage 626 having a gripper 620 which includes two gripper arms 618. Each gripper arm 618 can include a forward contact portion 617*a* and an aft contact portion 617*b* configured to releasably engage the fuselage 141 of the aircraft 140.

Figure 6C:
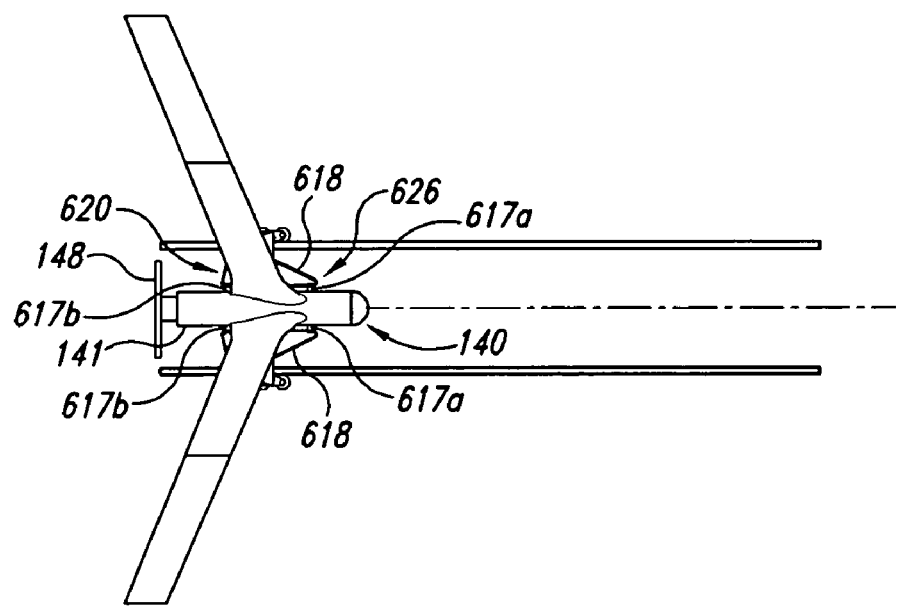
FIGS. 6C–6F are partially schematic illustrations of a carriage having a gripper arrangement for releasably carrying an unmanned aircraft in accordance with an embodiment of the invention.
Figure 6D:
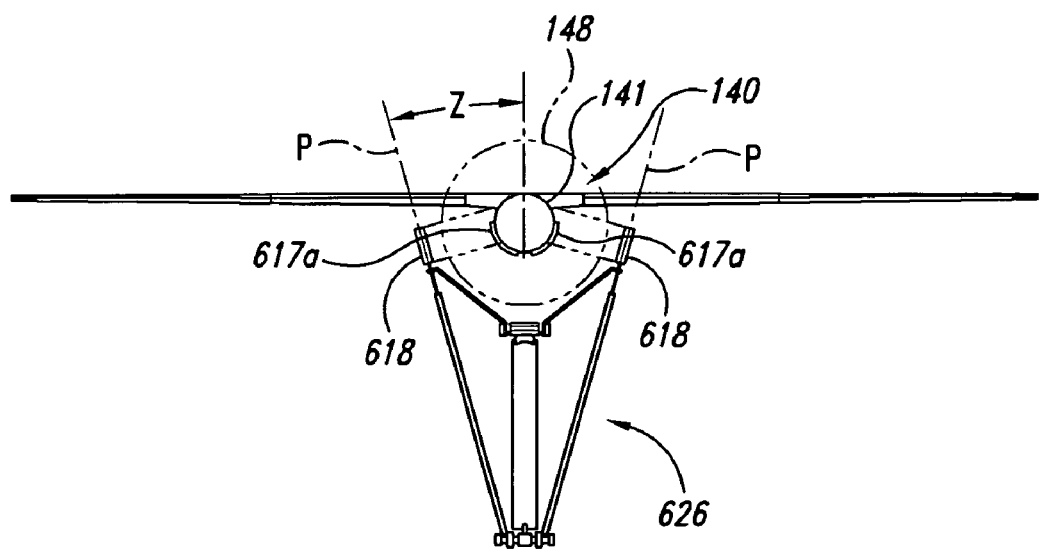

FIG. 6D is a front end view of the carriage 626 and the aircraft 140. As shown in FIG. 6D, each contact portion 617*a* can have a curved shape so as to conform to the curved shape of the fuselage 141. Each gripper arm 618 can be pivotably coupled to the carriage 626 to rotate about a pivot axis P. In one aspect of this embodiment, each pivot axis P is canted outwardly away from the vertical by an angle Z. As described in greater detail below, this arrangement can prevent interference between the gripper arms 618 and the aircraft 140 as the aircraft 140 is launched. In another aspect of this embodiment, the gripper arms 618 can pivot to a slightly over-center position to securely engage the fuselage 141 and to resist ambient wind loads, gravity, propeller thrust (e.g., the maximum thrust provided to the aircraft 140), and other external transitory loads.

Figure 6E:
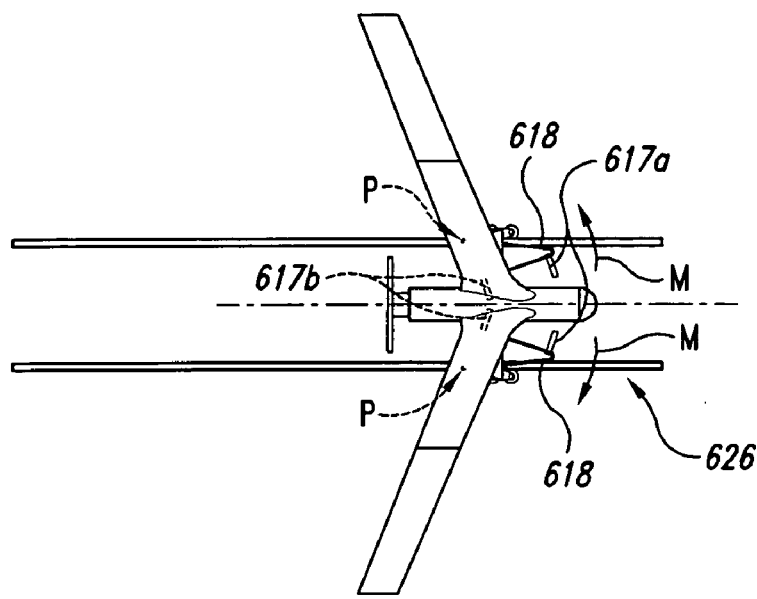

FIG. 6E is a top plan view of the carriage 626 as it reaches the end of its launch stroke. As the carriage 626 decelerates, the forward momentum of the gripper arms 618 causes them to fling open by pivoting around the pivot axes P, as indicated by arrows M, which can overcome the over-center action described above. As the gripper arms 618 begin to open, the contact portions 617a, 617b begin to disengage from the aircraft 140.

Figure 6F:
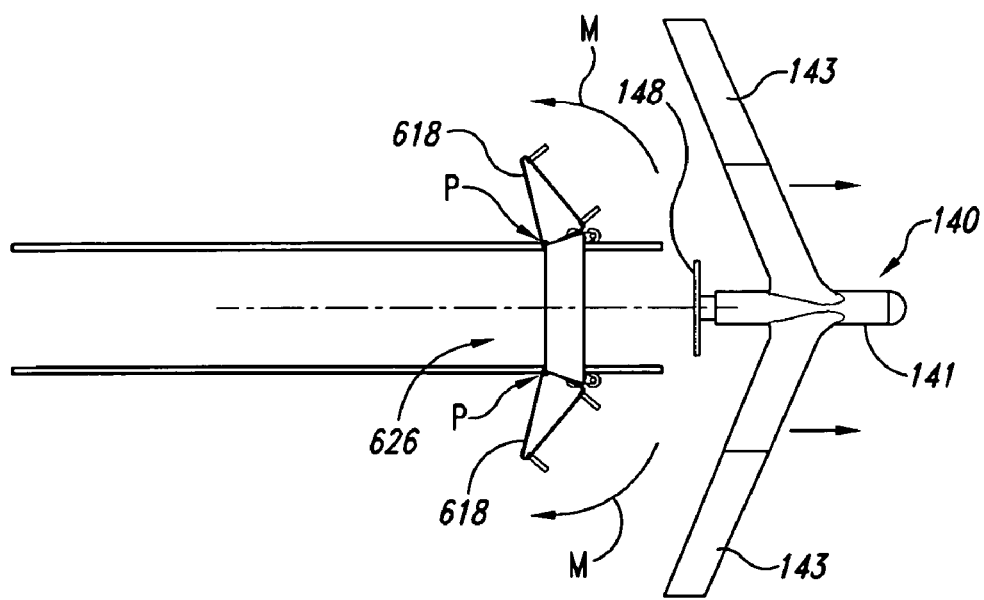

Referring now to FIG. 6F, the carriage 626 has come to a stop and the gripper arms 618 have pivoted entirely away from the aircraft 140, allowing the aircraft 140 to become airborne. As shown in FIG. 6F, the gripper arms 618 have pivoted in a manner so as not to interfere with the fuselage 141, the wings 143 or the propeller 148 of the aircraft 140. For example, as described above, the gripper arms 618 pivot about a canted pivot axis P. As a result, the gripper arms 618 can rotate downwardly (as well as outwardly) away from the aircraft 140 as the aircraft 140 takes flight.

One feature of an embodiment of the carriage 626 described above with reference to FIGS. 6C–6F is that the gripper arms 618 can engage the fuselage 141 of the aircraft 140. An advantage of this arrangement is that the gripping action provided by the gripper arms 618 can be distributed fore and aft over the fuselage 141, thus distributing the gripping load. A further advantage of embodiments of the foregoing arrangement is that the gripper arms 618 can be configured to quickly and completely rotate out of the way of the aircraft 140 as the aircraft 140 takes flight. Still a further advantage of the foregoing arrangement is that no additional hardware, with associated weight and drag, need be provided to the aircraft 140 to allow it to be releasably carried by the carriage 626.

Figure 6G:
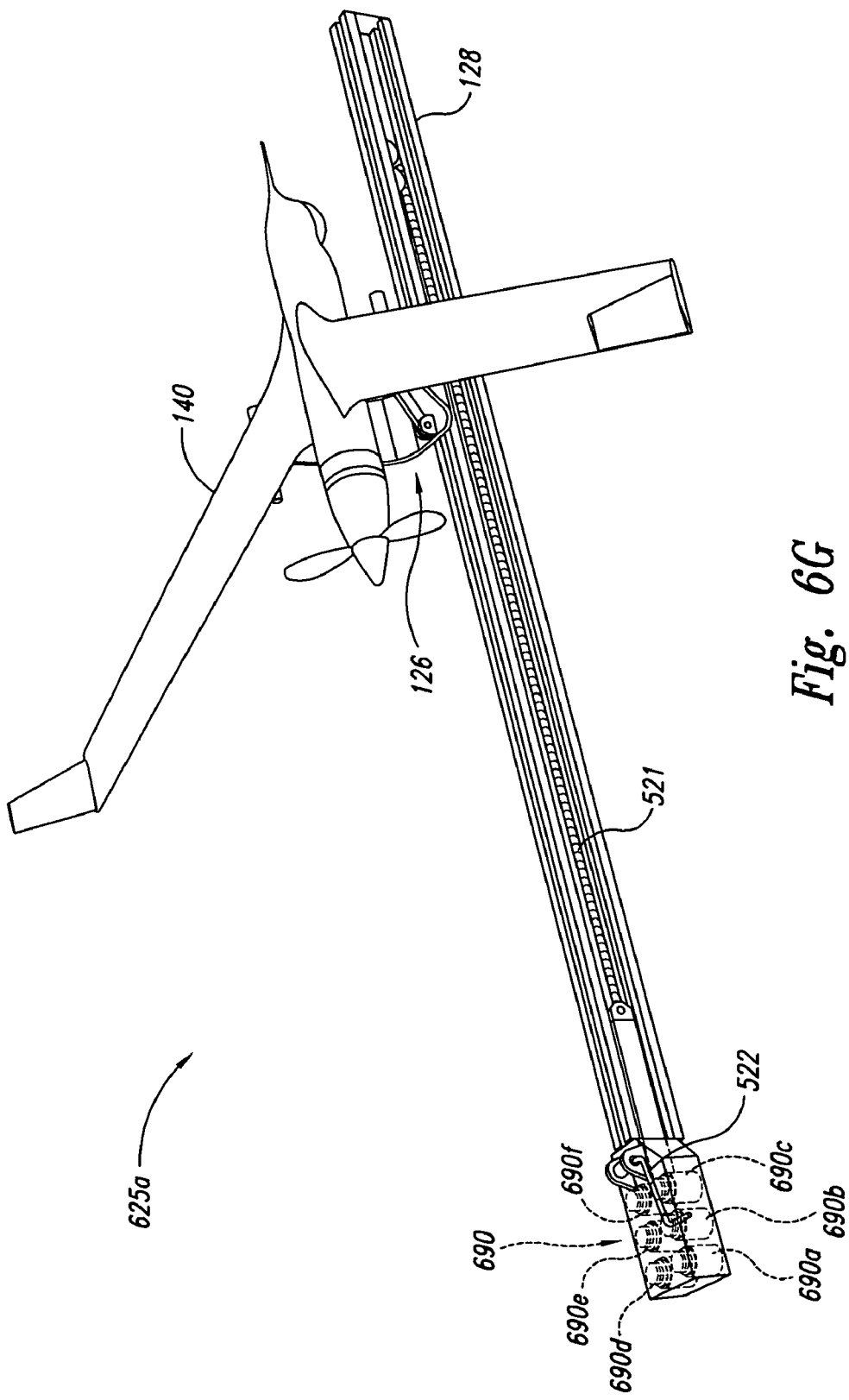
FIG. 6G illustrates an apparatus for launching an unmanned aircraft in accordance with another embodiment of the invention.

FIG. 6G illustrates a launch system 625a configured in accordance with still another embodiment of the invention. In one aspect of this embodiment, the launch system 625a can include a launch support member 128. A carriage 126 can carry the aircraft 140 along the launch support member 128 for takeoff. The force required to move the carriage 126 relative to the launch support member 128 can be provided by one or more constant force springs 690 (six are shown in FIG. 6G as springs 690a–690f). The springs 690 can be operatively coupled to the carriage 126 to force movement of the carriage 126 from left to right. In the illustrated embodiment, the springs 690a–690f are arranged in parallel. The number of springs 690 required to provide the necessary launch force can be adjusted based on specific operating conditions (e.g., the size of the aircraft 140, the length of the launch support member 128, and the local atmospheric conditions). Suitable constant force springs are available from Vulcan Spring and Mfg. Company of Telford, Pa. The launch system 625a can further include a carriage return crank or winch 522 (FIG. 5A) which can operate as described above to return the carriage from a post-launch position to a pre-launch position.

In one aspect of this embodiment, the springs 690 provide a constant force to the launch carriage 126. One advantage of using one or more constant force springs is that the resulting launch distance is reduced. Furthermore, when using a constant force spring, the acceleration of the launch carriage can be constant or nearly constant during launch, which can reduce the stresses applied to the aircraft 140. Another advantage of this arrangement is that the peak force on the launch system can be reduced by providing a constant force, which can in turn reduce the amount of structure (and therefore weight) required by the launch system.

Figure 7A:
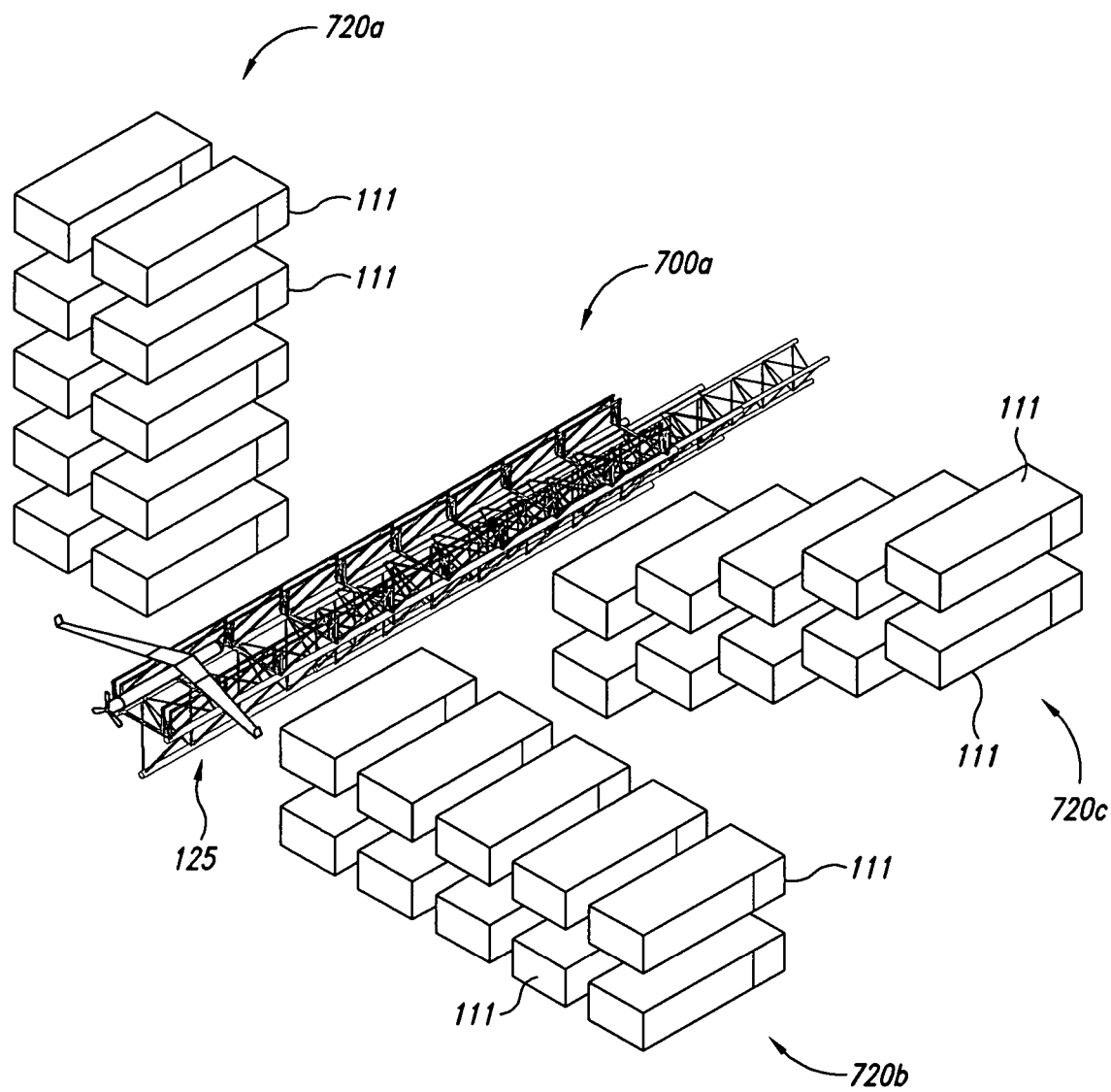
Figure 7B:
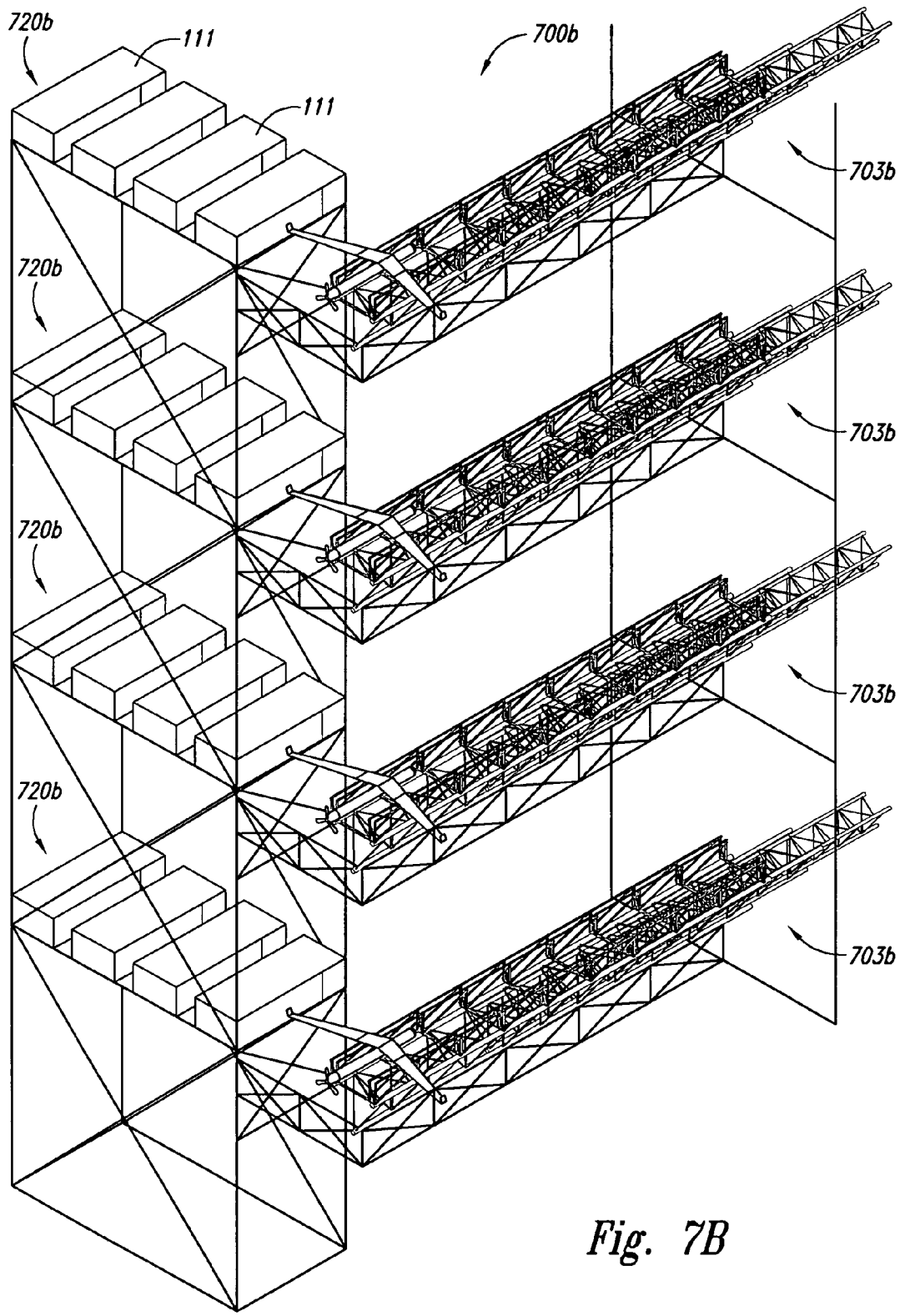

In other embodiments, the apparatus can be configured to rapidly launch a plurality of the aircraft 140. For example, as shown in FIG. 7A, an apparatus 700a configured in accordance with an embodiment of the invention can include multiple containers 111 positioned proximate to a launch system 125. In one aspect of this embodiment, the containers 111 can be positioned in one or more container groups 720 (shown in FIG. 7A as a vertical container group 720a, a horizontal container group 720b, and a diagonal container group 720c). In one embodiment, a single type of container group (e.g., a vertical container group 720a) can be positioned adjacent to a single launch system 125. In other embodiments, multiple container groups of different types can be positioned adjacent to a single launch system 125. In any of these embodiments, the containers 111 within each container group 720 can be easily accessible to operators preparing the aircraft 140 within the containers 111 for launch. Furthermore, the containers can be mechanically fed to the launcher, and assembly and positioning for launch then completed automatically as previously discussed. Accordingly, multiple aircraft 140 can be rapidly launched from a single launch system 125. An advantage of this arrangement is that in some circumstances, the targets toward which the aircraft 140 are launched extend over a wide territorial range, and/or change rapidly enough that a single aircraft 140 is unable to provide suitable coverage. By rapidly launching multiple aircraft 140, widely dispersed targets that change rapidly with time can more easily be surveilled or otherwise engaged.

In other embodiments, multiple launchers can be employed in combination with multiple containers to quickly deploy a plurality of the aircraft 140. For example, referring now to FIG. 7B, an apparatus 700b can include multiple aircraft handling systems 703b arranged vertically, and multiple container groups 720b, also arranged vertically. Each container group 720b can have horizontally grouped containers 111. In another arrangement shown in FIG. 7C, an apparatus 700c can include horizontally spaced-apart aircraft handling systems 703c, each supplied with aircraft 140 from containers 111 positioned in vertically stacked container groups 720a.

In any of the embodiments described above with reference to FIGS. 7A–7C, the aircraft handling systems can be supplied with containers 111 via gravity feed systems, mechanical rollers, slides, or other mechanisms. In a further aspect of these embodiments, each container group can also be mobile, for example, by placing stacks or rows of containers 111 on independently wheeled carriages, or on rails, skids, bearings, or floats. Accordingly, in still another aspect of these embodiments, the aircraft handling systems (in addition to the container groups) can also be mobile, for example, by positioning the aircraft handling systems on independently wheeled carriages, rails, skids, bearings or floats. As described above, an advantage of any of these embodiments is that multiple aircraft 140 can be deployed in rapid succession.

3. Vehicle Capture

FIGS. 8A–10F illustrate apparatuses and methods for capturing unmanned aircraft (including the aircraft 140 described above) in accordance with several embodiments of the invention. Beginning with FIG. 8A, the aircraft 140 can be captured by an aircraft handling system 803 positioned on a support platform 801. In one embodiment, the support platform 801 can include a boat 802 or other water vessel. In other embodiments, the support platform 801 can include other structures, including a building, a truck or other land vehicle, or an airborne vehicle, such as a balloon. In many of these embodiments, the aircraft handling system 803 can be configured solely to retrieve the aircraft 140 or, as described above with reference to FIG. 2, it can be configured to both launch and retrieve the aircraft 140.

Figure 8A:
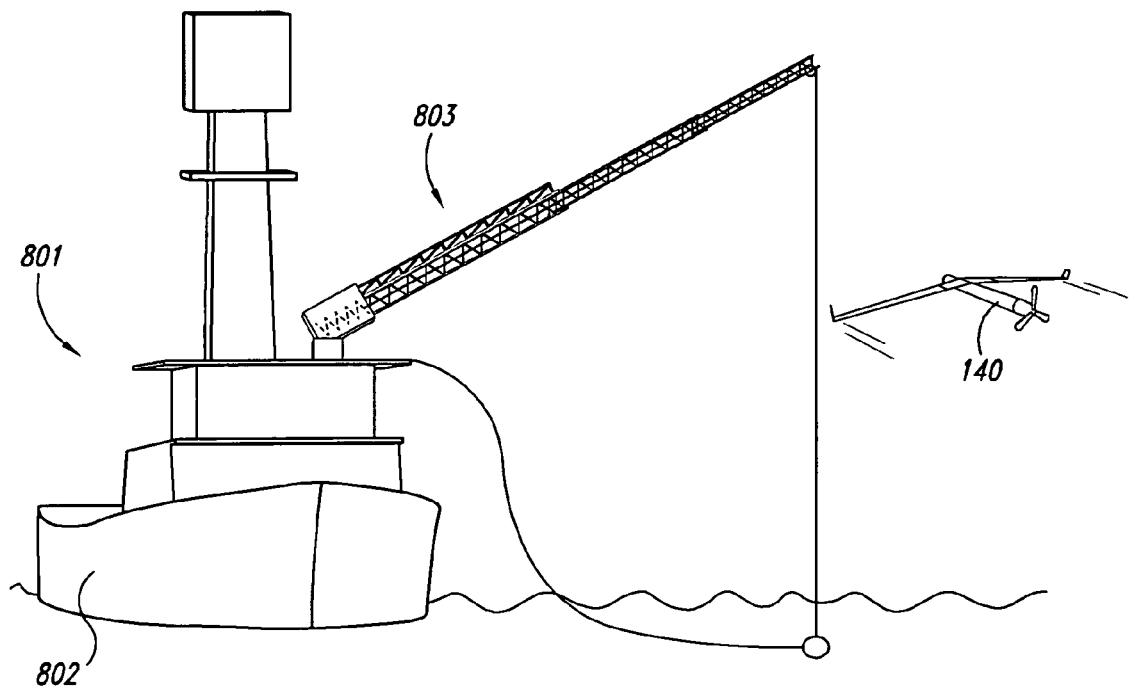
FIGS. 8A–8B illustrate an apparatus configured to recover an unmanned aircraft in accordance with an embodiment of the invention.
Figure 8B:
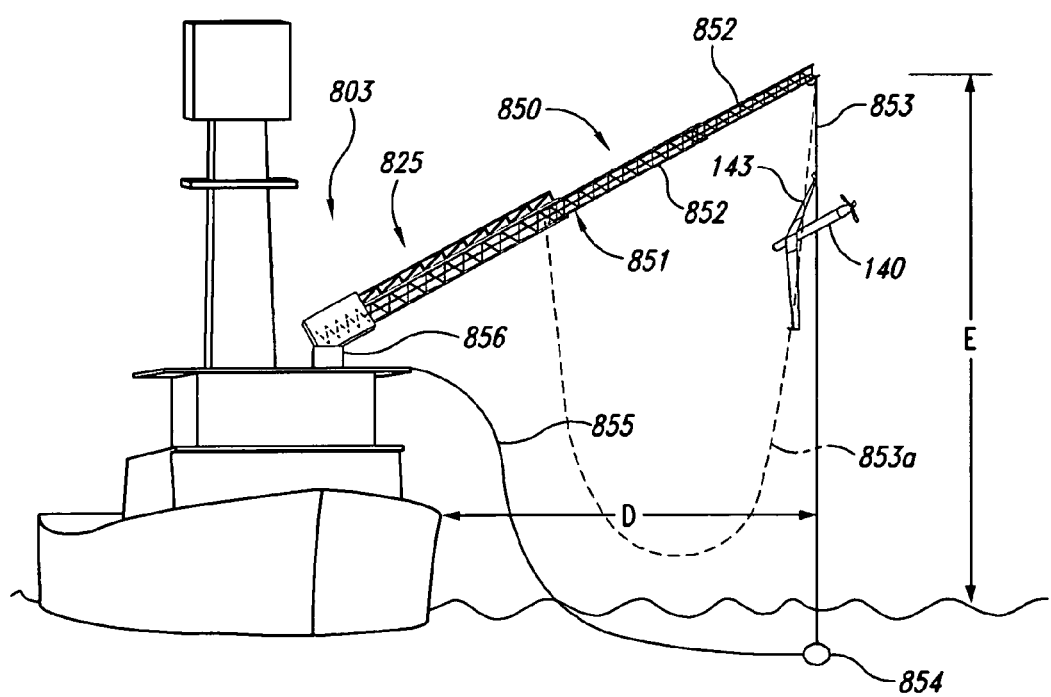

Referring now to FIG. 8B, the aircraft handling system 803 can include a recovery system 850 integrated with a launch system 825. In one aspect of this embodiment, the recovery system 850 can include an extendable boom 851 having a plurality of segments 852. The boom 851 can be mounted on a rotatable base 856 or turret for ease of positioning. The segments 852 are initially stowed in a nested or telescoping arrangement (generally similar to that described above with reference to FIG. 2) and are then deployed to extend outwardly as shown in FIG. 8B. In other embodiments, the extendable boom 851 can have other arrangements, such as a scissors arrangement, a parallel linkage arrangement or a knuckle boom arrangement. In any of these embodiments, the extendable boom 851 can include a recovery line 853 extended by gravity or other forces. In one embodiment, the recovery line 853 can include 0.25 inch diameter polyester rope, and in other embodiments, the recovery line 853 can include other materials and/or can have other dimensions. In any of these embodiments, a spring or weight 854 at the end of the recovery line 853 can provide tension in the recovery line 853. The aircraft handling system 803 can also include a retrieval line 855 connected to the weight 854 to aid in retrieving and controlling the motion of the weight 854 after the aircraft recovery operation has been completed. In another embodiment, a recovery line 853a can be suspended from one portion of the boom 851 and attachable to another point on the boom 851, in lieu of the recovery line 853 and the weight 854.

In one aspect of this embodiment, the end of the extendable boom 851 can be positioned at an elevation E above the local surface (e.g., the water shown in FIG. 8B), and a distance D away from the nearest vertical structure projecting from the local surface. In one aspect of this embodiment, the elevation E can be about 15 meters and the distance D can be about 10 meters. In other embodiments, E and D can have other values, depending upon the particular installation. For example, in one particular embodiment, the elevation E can be about 17 meters when the boom 851 is extended, and about 4 meters when the boom 851 is retracted. The distance D can be about 8 meters when the boom 851 is extended, and about 4 meters when the boom 851 is retracted. In a further particular aspect of this embodiment, the boom 851 can be configured to carry both a vertical load and a lateral load via the recovery line. For example, in one embodiment, the boom 851 can be configured to capture an aircraft 140 having a weight of about 30 pounds, and can be configured to withstand a side load of about 400 pounds, corresponding to the force of the impact between the aircraft 140 and the recovery line 853 with appropriate factors of safety.

In any of the foregoing embodiments, the aircraft 140 is captured when it flies into the recovery line 853. Once captured, the aircraft 140 is suspended from the recovery line by the wing 143. Further details of apparatuses and methods for capturing the aircraft 140 are described below with reference to FIGS. 9A–10D.

Figure 9A:
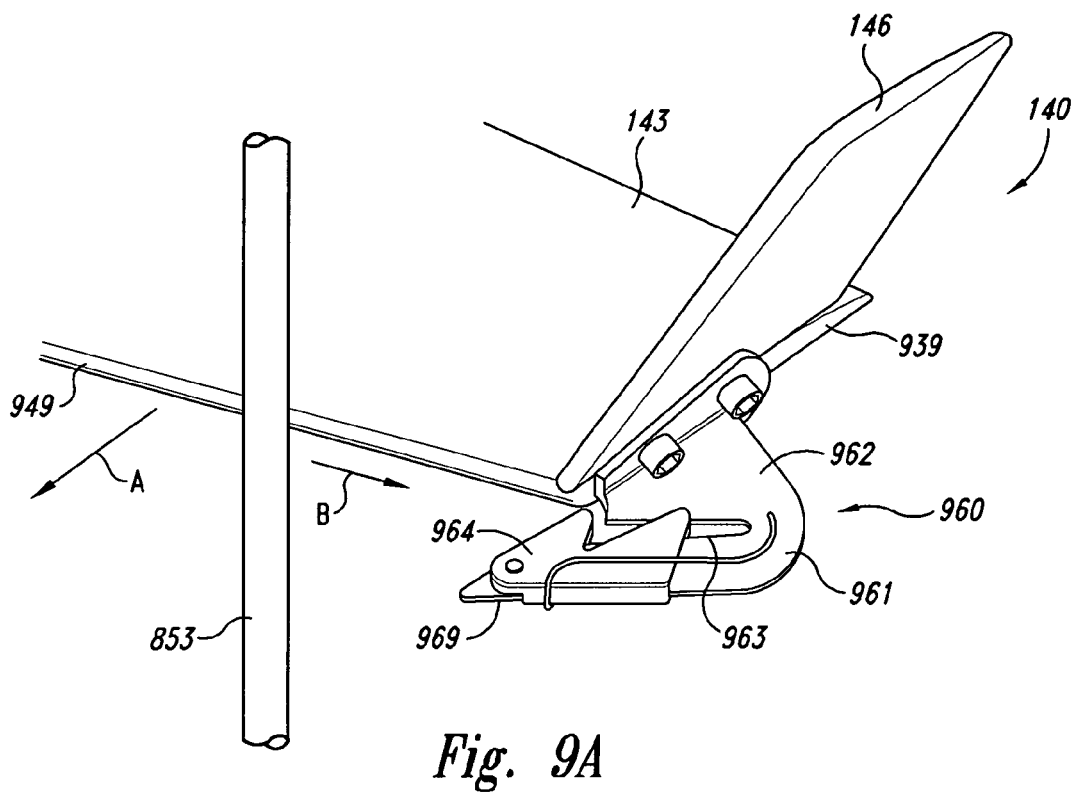
FIGS. 9A–9D illustrate a line capture device configured in accordance with an embodiment of the invention.

FIG. 9A is a partially schematic, isometric illustration of an outboard portion of the wing 143 and the winglet 146 of the aircraft 140 shown in FIG. 8B. In one aspect of this embodiment, the wing 143 includes a leading edge 949 (which can be swept), an outboard edge 939, and a line capture device 960 positioned at the outboard edge 939. In other embodiments, each wing 143 can include a plurality of line capture devices 960 located along the span of the wing 143. In any of these embodiments, the line capture device 960 can include a cleat 961 fixedly attached to the wing 143 that engages the recovery line 853 to releasably and securely attach the aircraft 140 to the recovery line 853. The cleat 961 can include a cleat body 962, a cleat slot 963 positioned in the cleat body 962, and a gate or retainer 964 attached to the cleat body 962. As the aircraft 140 flies toward the recovery line 853 (as indicated by arrow A), the recovery line 853 strikes the wing leading edge 949 and causes the aircraft to yaw toward the recovery line 853, which then slides outboard along the leading edge 949 toward the line capture device 960 (as indicated by arrow B). The recovery line 853 then passes into the cleat slot 963 and is retained in the cleat slot 963 by the retainer 964, as described in greater detail below with reference to FIGS. 9B–9C. In other embodiments, the retainer 964 can be eliminated and the recovery line 853 can still be securely pinched in the cleat slot 963.

If the aircraft 140 is not properly aligned with the recovery line 853 during its approach, the recovery line 853 may strike the line capture device 960 instead of the leading edge 949. In one embodiment, the cleat body 962 includes a cleat leading edge 969 which is swept aft so as to deflect the recovery line 853 away from the aircraft 140. This can prevent fouling of the line 853 and can reduce the yawing moment imparted to the aircraft 140, allowing the aircraft 140 to recover from the missed capture and to return for another capture attempt.

Figure 9B:
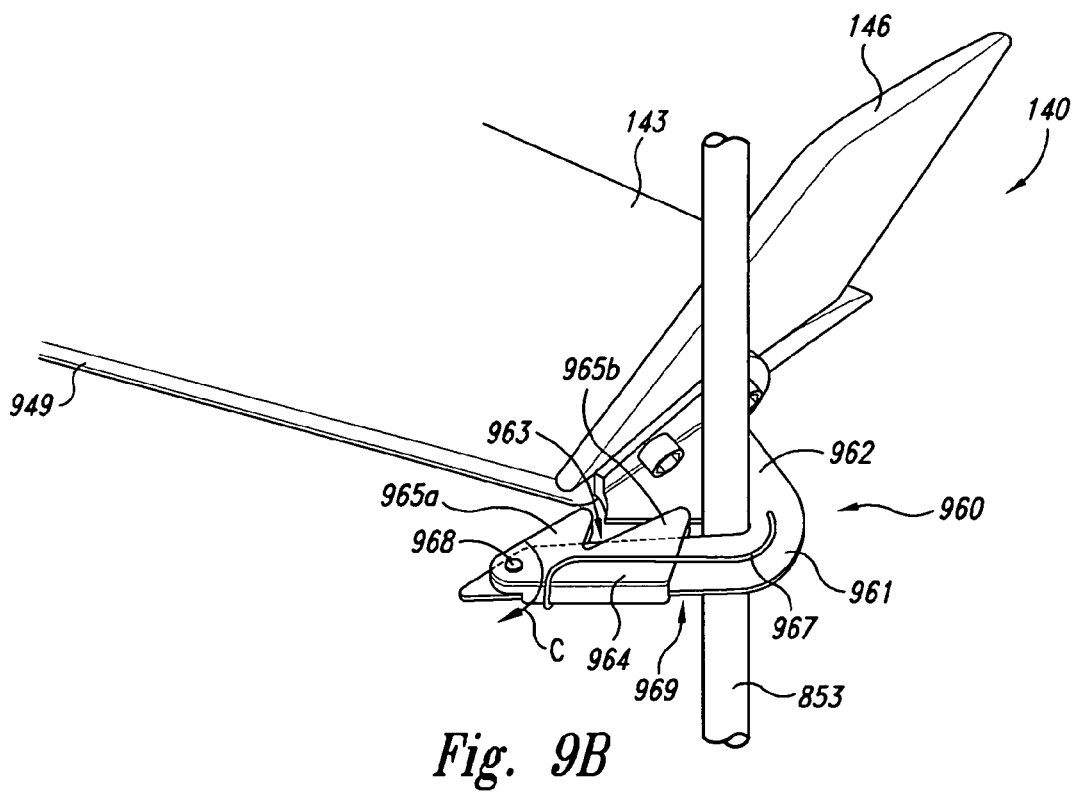

FIG. 9B is an enlarged, isometric illustration of a portion of the wing 143 and the line capture device 960 described above with reference to FIG. 9A. As described above with reference to FIG. 9A, the recovery line 853 travels outboard along the wing leading edge 949 to position the recovery line 853 at the cleat slot 963 of the line capture device 960. In one aspect of this embodiment, the retainer 964 of the cleat 961 includes two or more closure arms 965 (two are shown in FIG. 9B as a first closure arm 965a and a second closure arm 965b) that extend over the cleat slot 963. The retainer 964 is pivotally mounted to the cleat body 962 at a pivot joint 968, and is forced toward a closed position (shown in FIG. 9B) by a spring 967. As the recovery line 853 strikes the first closure arm 965a from outside the cleat slot 963, the force on the first closure arm 965a forces the retainer 964 to rotate about the pivot joint 968 (as indicated by arrow C) to an open position, allowing the recovery line 853 to move into the cleat slot 963. The recovery line 853 continues through the cleat slot 963, allowing the retainer 964 to begin closing as it passes the first closure arm 965a. The recovery line 853 then strikes the second closure arm 965b to force the retainer 964 back open again, and then travels further in the slot 963. In one aspect of this embodiment, the slot 963 (which can be tapered) has a width that is less than a diameter of the recovery line 853. Accordingly, the recovery line 853 can be pinched in the slot 963 as the recovery line 853 travels outboard and aft, securing the aircraft 140 to the recovery line 853. The momentum of the aircraft 140 relative to the recovery line 853 provides the impetus to securely engage the recovery line 853 with the line capture device 960.

As described above, the retainer 964 can include a first closure arm 965a and a second closure arm 965b. One advantage of a retainer 964 having a first closure arm 965a and a second closure arm 965b is that, if the relative velocity between the recovery line 853 and the aircraft 140 is insufficient to cause the recovery line 853 to travel to the end of the cleat slot 963, the retainer 964 can close around the recovery line 853, with the recovery line 853 positioned between the first closure arm 965a, and the second closure arm 965b. Accordingly, this arrangement can arrest and secure the aircraft 140 even though the recovery line 853 has a relatively low outboard and aft velocity component relative to the capture device 960.

Figure 9C:
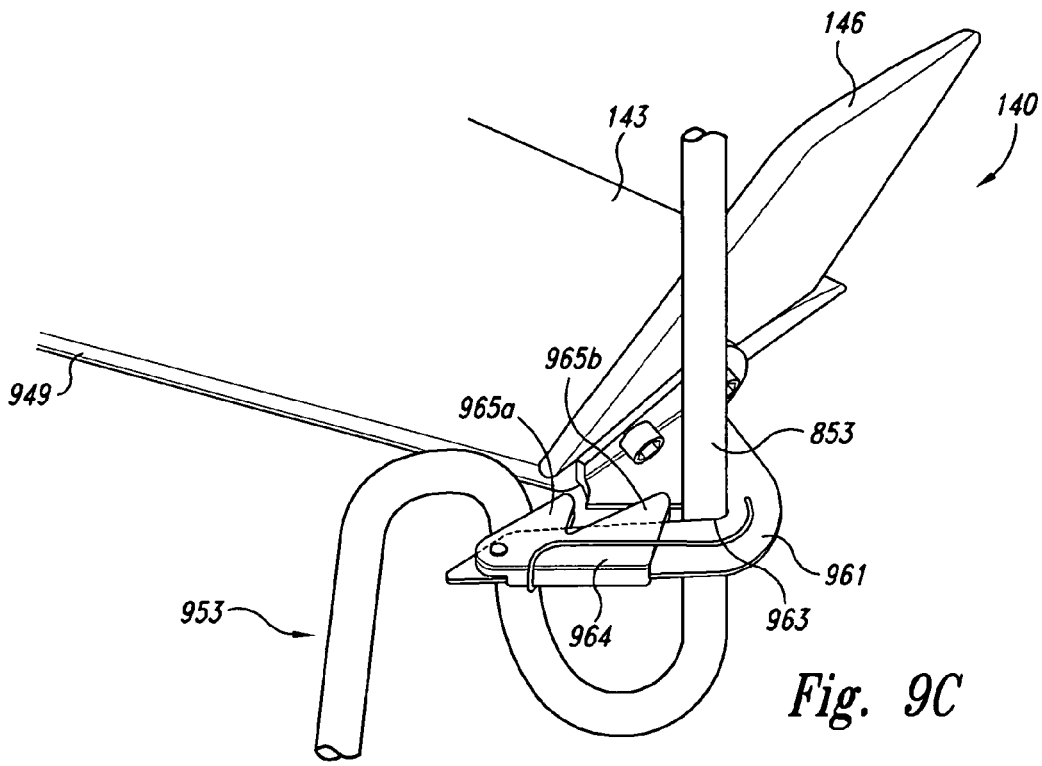

Another advantage of the foregoing features, as shown in FIG. 9C is that, as the aircraft 140 is captured on the recovery line 853, the recovery line 853 may twist so as to form a looping portion 953. The retainer 964 can prevent the recovery line 853 from passing out of the cleat slot 963, even if the recovery line 853 experiences forces inboard and forward relative to the capture device 960. The recovery line 853, secured in the cleat slot 963, also serves to resist further opening of the retainer 964. Furthermore, without the closure arms 965, tension on the end of a loop 953 could pull the recovery line 853 free of the cleat slot 963. The closure arms 965 can prevent this by admitting only one diameter of the recovery line 853.

Figure 9D:
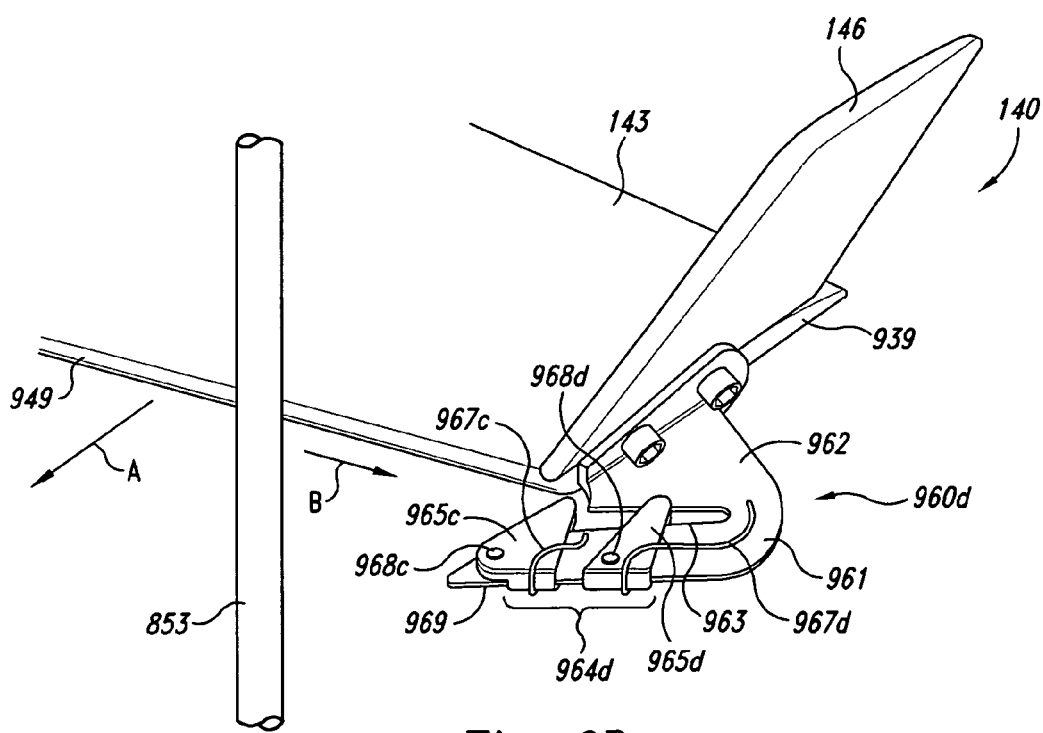

FIG. 9D is a partially schematic, isometric illustration of a portion of a wing 143 of the aircraft 140 with a line capture device 960d positioned at the outboard edge 939 of the wing 143 in accordance with another embodiment of the invention. In one aspect of this embodiment, the line capture device 960d includes a cleat body 962 and a retainer 964d having two cleat arms 965c, 965d that pivot independently relative to the cleat slot 963. Each cleat arm 965c, 965d is pivotally mounted to the cleat body 962 at a corresponding pivot joint 968c, 968d, and is forced toward a closed position by a corresponding spring 967c, 967d. The individual cleat arms 965c, 965d can provide generally the same function as the cleat arms 965a, 965b described above with respect to FIGS. 9B–9C, e.g., to consistently and securely capture the recovery line 853.

Figure 10A:
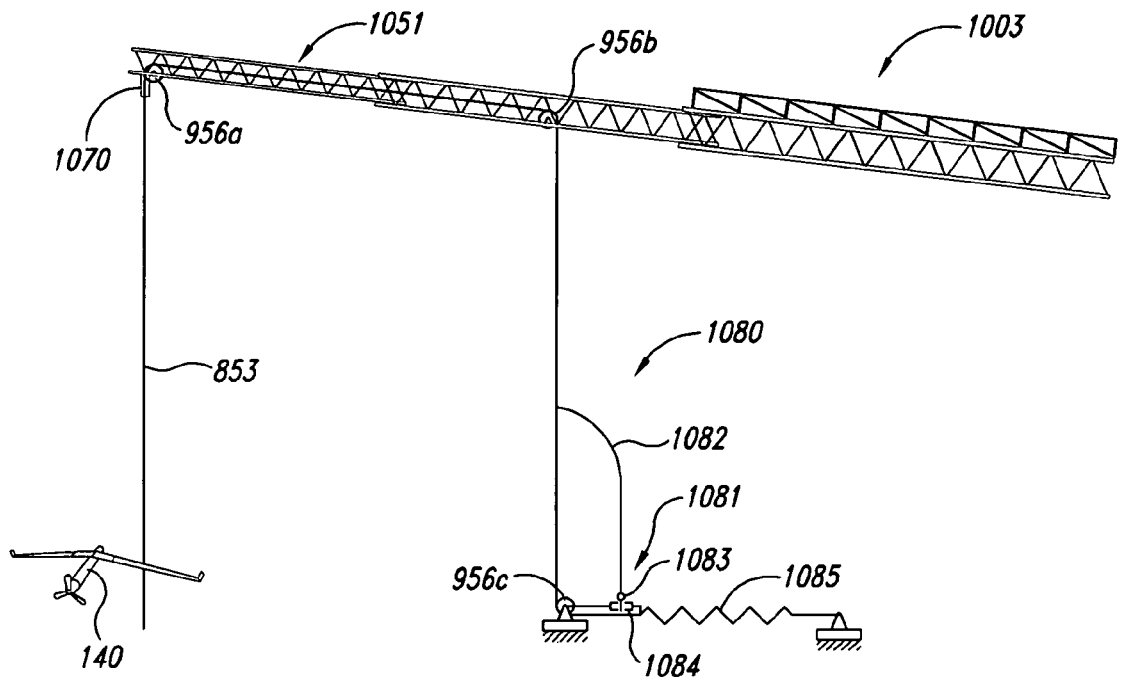
FIGS. 10A–10D are partially schematic illustrations of a portion of a recovery system, configured to recover an unmanned aircraft and control post-recovery motion of the aircraft in accordance with an embodiment of the invention.

FIGS. 10A–10D illustrate a method and apparatus for further securing the aircraft 140 after it is attached to the recovery line 853. Referring first to FIG. 10A, an aircraft handling system 1003 in accordance with an embodiment of the invention can include a hoist device 1080 coupled to the recovery line 853. The recovery line 853 can pass over a series of pulleys 956, shown in FIG. 10A as a first pulley 956a, a second pulley 956b and a third pulley 956c. The recovery line 853 can also pass through a restraining device 1070 operatively coupled to the extendable boom 1051.

The hoist device 1080 can include a spring 1085 or other forcing mechanism (including a weight, a hydraulic or pneumatic actuator, or an electric motor) coupled to the recovery line 853 in a deployable or triggerable manner that allows the spring 1085 to take up the recovery line 853. The hoist device 1080 can also include a damper (not shown in FIG. 10A) to smooth out the action of the spring 1085. In one aspect of this embodiment, the hoist device 1080 can include a release mechanism 1081 configured to activate the spring 1085. In a further aspect of this embodiment, the release mechanism 1081 can include a release link 1082 coupled to the recovery line 853. The release link 1082 can include a trigger 1083 received in a corresponding trigger receptacle 1084. The trigger receptacle 1084 is positioned at an interface between the spring 1085 and the recovery line 853. Before the aircraft 140 strikes the recovery line 853, the trigger 1083 can be engaged with the trigger receptacle 1084, so that the spring 1085 does not act on the recovery line 853.

Figure 10B:
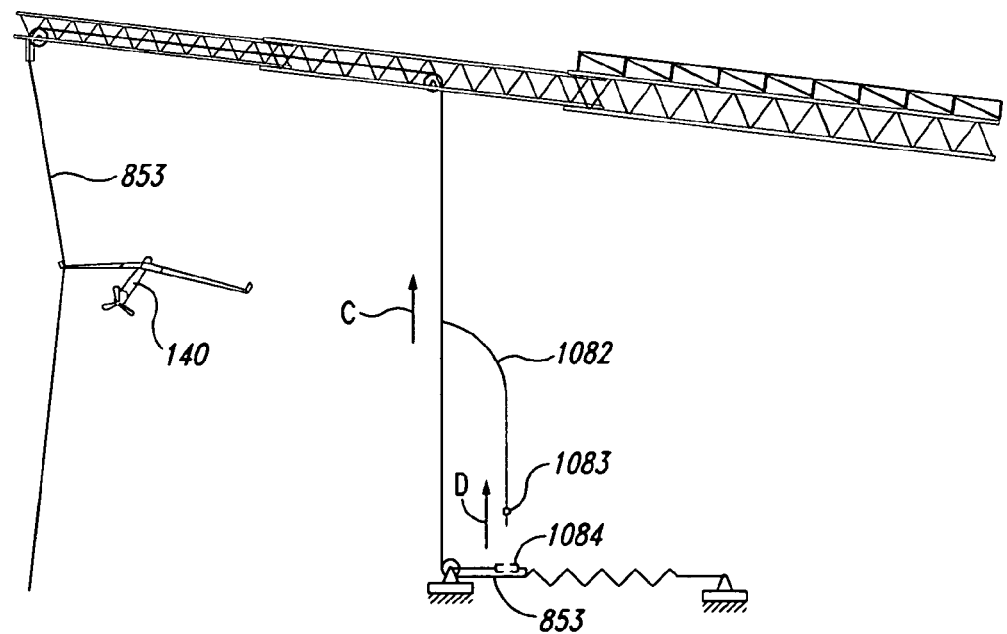

Referring now to FIG. 10B, as the aircraft 140 strikes and engages with the recovery line 853, it imparts a vertical force on the release link 1082 (as indicated by arrow C), causing the trigger 1083 to pull out of the trigger receptacle 1084, as indicated by arrow D. Accordingly, in this embodiment, the trigger 1083 is activated when a threshold extension or travel of the recovery line 853 is exceeded. In other embodiments, the trigger 1083 can be activated by other mechanisms, for example, when a threshold tension in the recovery line 853 is exceeded.

Figure 10C:
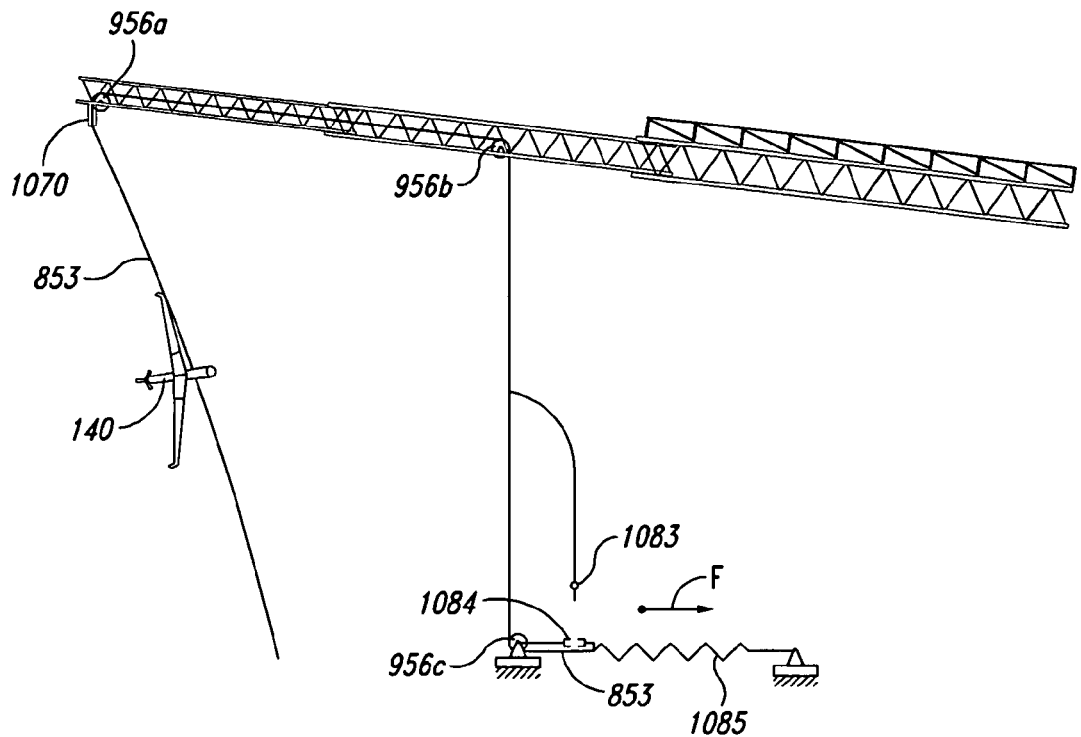
Figure 10D:
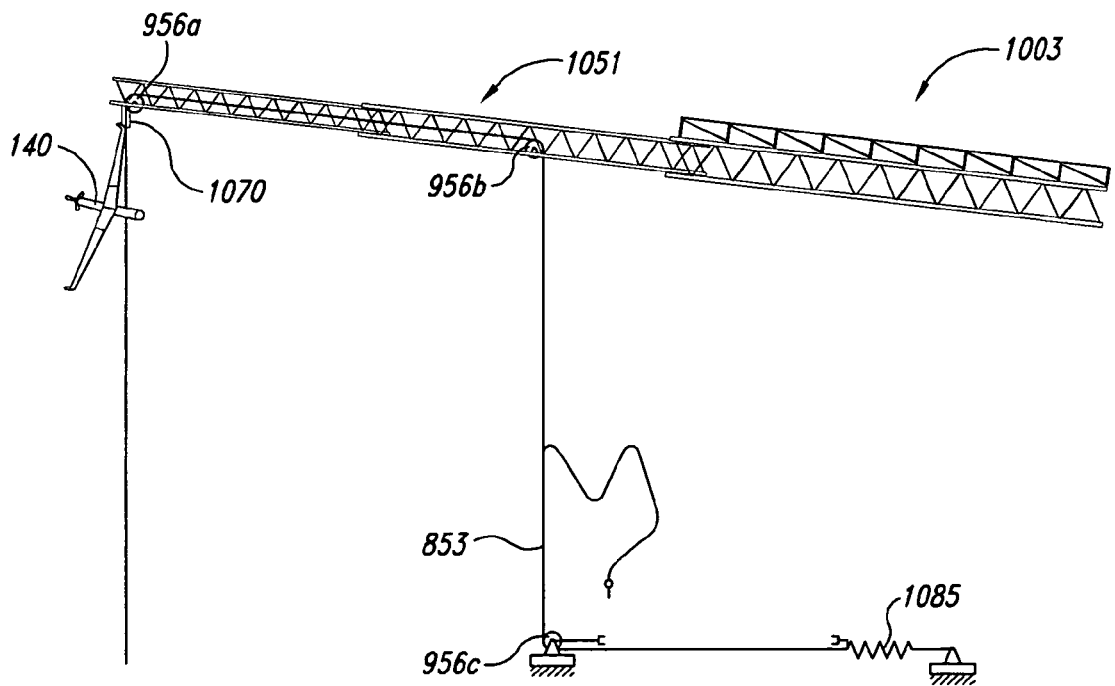

Referring next to FIG. 10C, once the trigger 1083 has been released from the trigger receptacle 1084, the spring 1085 begins to exert a force (indicated by arrow F) on the recovery line 853. Concurrently, the aircraft 140 may be swinging from side to side as it is suspended from the recovery line 853, thus exerting a centrifugal force on the recovery line 853. The force F exerted by the spring 1085 on the recovery line 853 compensates for the weight of the aircraft 140 hanging on the recovery line 853 and the centrifugal force caused by the aircraft swinging on the line after capture. As shown in FIG. 10D, the spring 1085 can draw the recovery line 853 around the pulleys 956 to reduce the line length between the first pulley 956a and the aircraft 140. As the spring 1085 acts, it hoists the aircraft 140 up toward the restraining device 1070 at the end of the extendable boom 1051. The spring 1085 can be sized so as not to exert so much force on the recovery line 853 that the aircraft 140 strikes the restraining device 1070 with excessive force and damages the aircraft 140.

The restraining device 1070 is configured to releasably engage a portion of the aircraft 140, thus stabilizing the aircraft 140 after it is hoisted up by the recovery line 853 to the extendable boom 1051. In one embodiment, the restraining device 1070 can include a piece of pipe operatively connected to the end of the boom 1051. In other embodiments, the restraining device 1070 can include both active and passive devices to engage and restrain at least a portion of the aircraft 140, including an innertube apparatus configured to surround at least a portion of the aircraft 140, a plurality of cushions configured to "sandwich" the aircraft 140, or an umbrella which softly closes around the aircraft 140. In other embodiments, the restraining device can have other arrangements, or the restraining device may be omitted.

If, after the aircraft 140 is caught and substantially decelerated, it is allowed to swing freely on the recovery line 853 (in response to wind or motion of the boom 1051) then it may be damaged by collision with structures in the swing space including (when the boom 1051 is carried by a ship) the ship's mast and deck. The vulnerability of the aircraft 140 to damage can be much reduced by hoisting the recovery line 853 such that the line capture device 960 (FIGS. 9A–9B) or nearby surfaces of the aircraft 140 are pulled firmly against the restraining device 1070 or a stiff object attached to the boom 1051. The aircraft's freedom to swing is thereby much reduced. Firm contact between the aircraft 140 and the boom 1051 can be maintained as the aircraft 140 is lowered, for example, by articulation of the boom 1051 or by translation on a trolley. When sufficiently close to the deck, the aircraft 140 can be securely removed from the recovery line 853 and stowed.

Figure 10E:
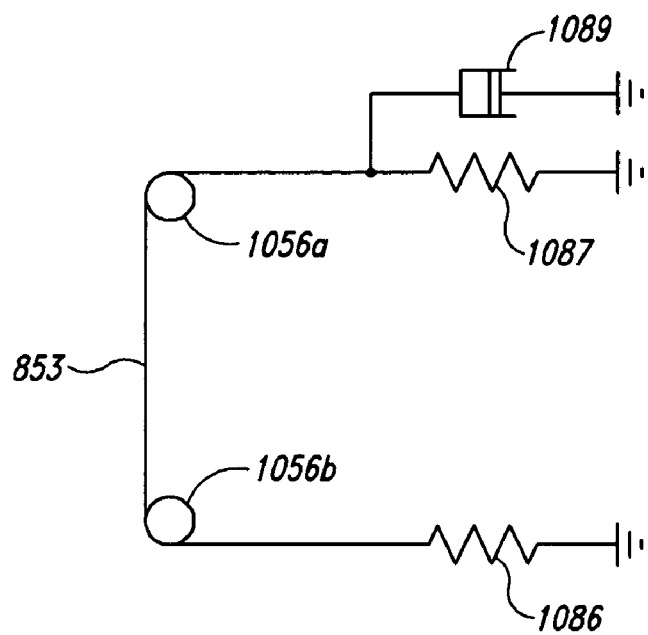
FIGS. 10E–10F are schematic illustrations of portions of recovery systems configured to provide tension in a recovery line in accordance with further embodiments of the invention.
Figure 10F:
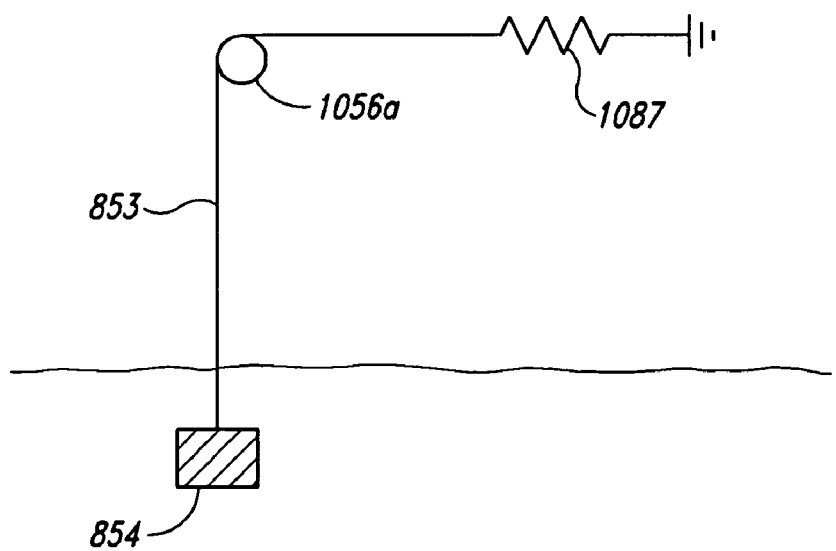

FIGS. 10E–10F are schematic illustrations of apparatuses for providing tension in the recovery line 853 before, during, and after aircraft capture. Referring first to FIG. 10E, the recovery line 853 can pass over a series of pulleys 1056, shown as a first pulley 1056a and a second pulley 1056b. In another aspect of this embodiment, the recovery line 853 can be operatively coupled to a first axially resilient member 1086 and a second axially resilient member 1087. The first and second axially resilient members 1086, 1087 can provide tension in the recovery line 853 before the aircraft (not shown) intercepts the recovery line at a location between the first pulley 1056a and the second pulley 1056b. In one embodiment, the axially resilient members 1086, 1087 can include a spring or other forcing mechanism (including a weight, a hydraulic or pneumatic actuator, or an electric motor) coupled to the recovery line 853. In another aspect of this embodiment, a damper 1089 can be operatively coupled to the recovery line 853 in parallel or in series with at least one of the axially resilient members 1086, 1087 to smooth out the action of the axially resilient members 1086, 1087. In another embodiment, the axially resilient members 1086, 1087 can be omitted and the recovery line 853 can be operatively coupled to only the damper 1089. In this embodiment, the damper 1089 provides only a drag force on the recovery line 853.

Referring next to FIG. 10F, in another embodiment, the recovery line 853 can be operatively coupled to a weight 854 and an axially resilient member 1086 to provide tension in the line. In one embodiment, the axially resilient member 1086 can include a constant force spring similar to the constant force spring 690 described above with respect to FIG. 6G.

An advantage of the foregoing arrangements is that the aircraft 140 can be less likely to swing about in an uncontrolled manner (e.g., when acted on by the wind) during subsequent portions of the recovery operation. Accordingly, the aircraft 140 will be less likely to become damaged by inadvertent contact with the ground, water, or the support platform from which the aircraft handling system 1003 extends. The aircraft will also be less likely to damage surrounding structures. In other embodiments, the boom 1051 can also be elevated as or after the recovery line 853 is taken up, to keep the aircraft 140 clear of surrounding structures.

4. Vehicle Disassembly and Stowage

Figure 11A:
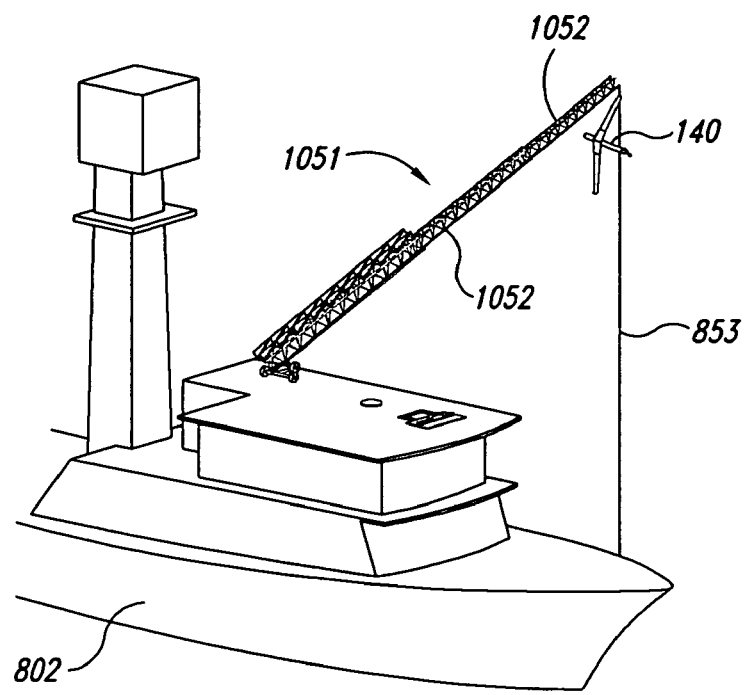
Figure 11B:
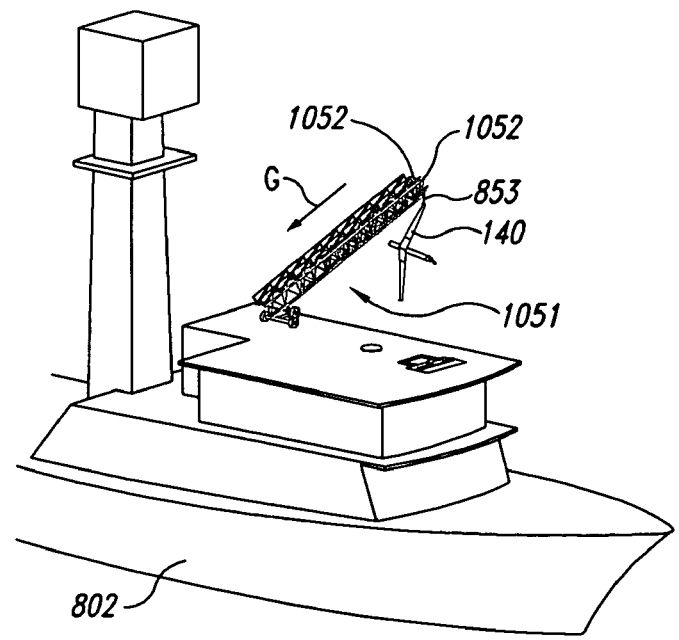

FIGS. 11A–11G illustrate a method for removing the aircraft 140 from the recovery line 853 and further securing and disassembling the aircraft 140. FIG. 11A is an isometric view of the aircraft 140 suspended from the extendable boom 1051, which is in turn carried by the boat 802 or other support platform. As shown in FIG. 11A, the motion of the aircraft 140 has been arrested and the aircraft 140 has been hoisted to the end of the boom 1051. Referring now to FIG. 11B, the boom 1051 can be retracted (as indicated by arrow G), by nesting the segments 1052 of the boom 1051. The aircraft 140 is accordingly brought closer to the boat 802 or other support platform while its motion is constrained (e.g., by the restraining device 1070). For purposes of illustration, the portion of the recovery line 853 below the aircraft 140 is not shown in FIGS. 11B–11E.

Referring next to FIG. 11C, the boom 1051 can then be swiveled (as indicated by arrow J) to align one of the wings 143 of the aircraft 140 with a securement hook 1190 positioned on a deck 1104 of the boat 802. In one aspect of this embodiment, the securement hook 1190 can engage the line capture device 960 at the end of the wing 143, and in other embodiments, the securement hook 1190 can engage other portions of the aircraft 140. In any of these embodiments, the securement hook 1190 can be positioned proximate to a bracket 1191 that includes a cradle 116 connected to a container bottom 112. As described in greater detail below with reference to FIGS. 11D–G, the bracket 1191 can be movable to position the cradle 116 proximate to the aircraft 140 in preparation for stowage.

FIG. 11D is an aft isometric view of the aircraft 140 releasably suspended between the retracted boom 1051 and the securement hook 1190 in accordance with an embodiment of the invention. The bracket 1191 can be mounted to the deck 1104 such that the cradle 116 is positioned properly for receiving the fuselage 141 of the aircraft 140. In one aspect of this embodiment, the aircraft 140 can be engaged with the cradle 116 by lowering the boom 1051 until the fuselage 141 rests in the cradle 116. In another embodiment, the bracket 1191 can be pivotably coupled to the deck 1104 at a pair of pivot joints 1192. Accordingly (referring now to FIG. 11E), the bracket 1191 (with the container floor 112 and the cradle 116 attached) can be rotated upwardly as indicated by arrow K to engage the cradle 116 with the fuselage 141. An operator can then secure clamps 1193 around the fuselage 141 to firmly and releasably attach the aircraft 140 to the cradle 116.

Figure 11F:
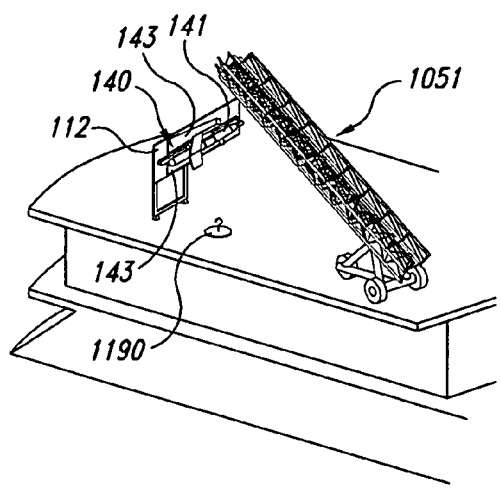

Referring now to FIG. 11F, the operator can detach the two wings 143 from the extendable boom 1051 and the securement hook 1190, respectively. The wings 143 can then be detached from the aircraft 140. In a further aspect of this embodiment, the removed wings 143 can be stowed on the container floor 112 adjacent to the fuselage 141 of the aircraft 140.

Figure 11G:
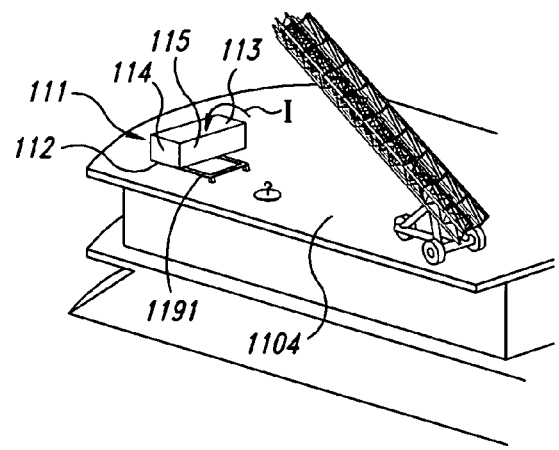

Referring now to FIG. 11G, the bracket 1191 can be rotated downwardly as indicated by arrow I until the container bottom 112 rests on the deck 1104. The aircraft 140 (not visible in FIG. 11G) can then be completely enclosed by adding ends 114, sides 115, and a top 113 to the container bottom 112, forming a protective sealed container 111 around the aircraft 140.

Figure 12A:
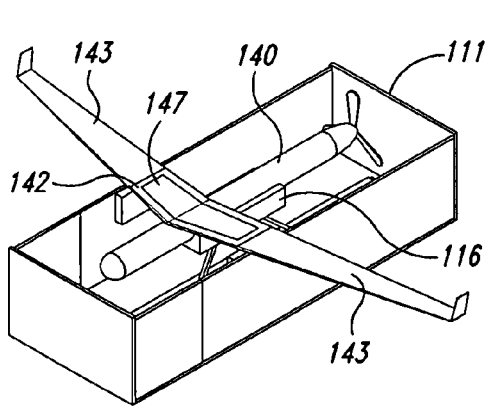
FIGS. 12A–12E are partially schematic illustrations of a container and method for disassembling and stowing an unmanned aircraft in accordance with another embodiment of the invention.
Figure 12B:
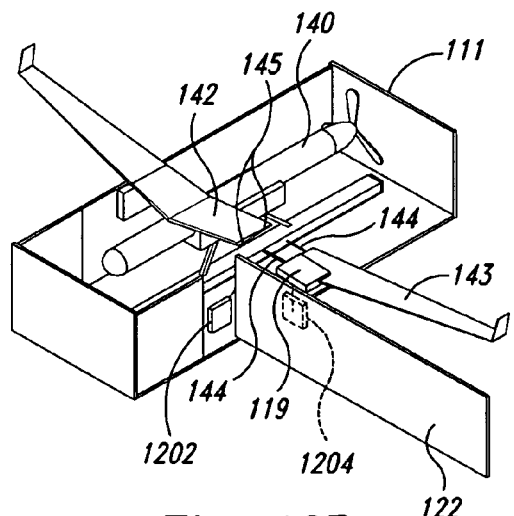
Figure 12C:
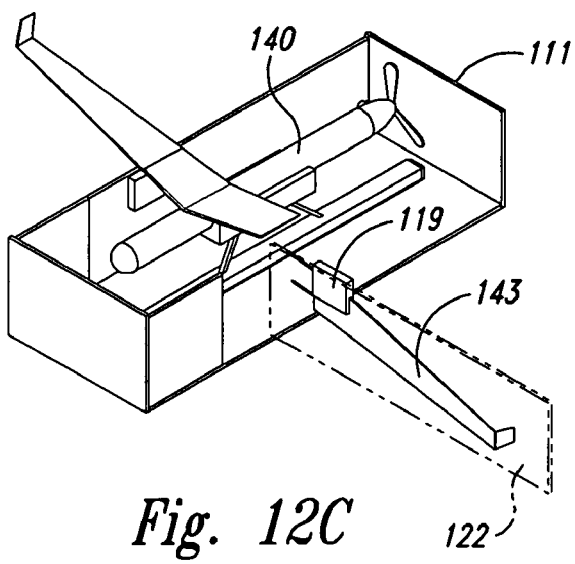
Figure 12D:
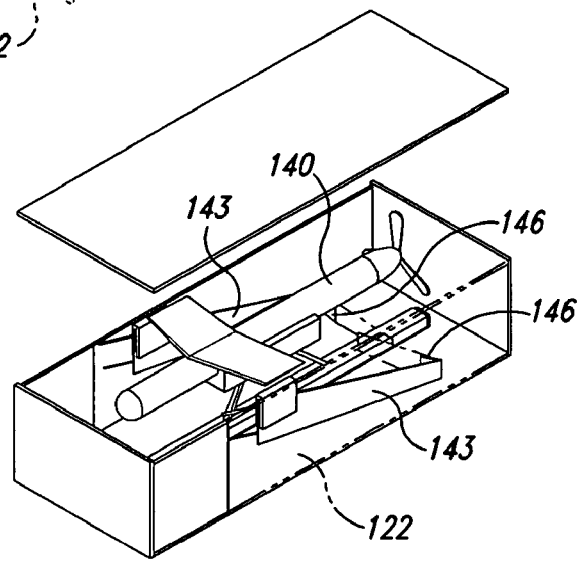
Figure 12E:
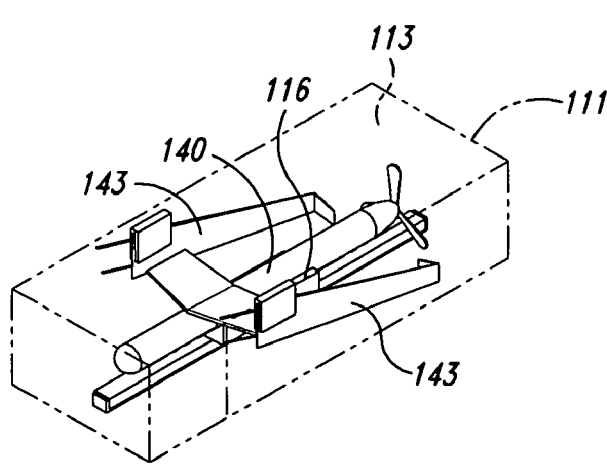

In another embodiment, illustrated schematically in FIGS. 12A–12E, the aircraft 140 can be disassembled and stowed in a manner that is generally the reverse of the method described above with reference to FIGS. 1A–1E. Accordingly, (referring first to FIG. 12A), the aircraft 140 can be attached to the cradle 116, with the container 111 fully assembled except for the container top 113 (not shown in FIG. 12A). The wing retainers (which connect the wings 143 to the wing stub 142) can be accessed for removal by opening the hatch 147 positioned in the wing stub 142. As shown in FIG. 12B, an operator can detach the wing 143 from the wing stub 142 by translating and rotating the container section 122 to engage the gripper 119 with the wing 143. The operator can then slide the gripper 119 along a track on the inner surface of the container section 122 to withdraw the spars 144 from the spar receptacles 145, and to fully release the wing 143 from the rest of the aircraft 140. The wing 143 can then be folded downwardly against the inner surface of the container section 122, as shown in FIG. 12C, and the container section 122 can be pivoted back into position as shown in FIG. 12D. The foregoing steps can be repeated for the other wing 143 to complete the disassembly of the aircraft 140. In one aspect of this embodiment, the wings 143 can be offset longitudinally from each other when stowed so that the stowed winglets 146 (if long enough) do not interfere with each other within the container 111. Referring now to FIG. 12E, the cradle 116 can be lowered into the container 111 and the top 113 placed on the container 111 to complete the stowage operation.

The above-described process can be fully automated following the initial attachment of the aircraft 140 to the cradle 116 by the addition of actuators. Referring to FIG. 12B, in an exemplary embodiment an actuator 1202 (shown schematically) can move the container section 122 relative to the rest of the container 111. Actuator 1204 (shown schematically) can move the gripper 119 relative to the container section 122. Further actuators (not shown) can move other portions of the container 111 and/or aircraft 140. This process can operate in reverse order to fully automate the aircraft assembly process, as described above with respect to FIGS. 1A–1E.

One feature of embodiments of the apparatuses and methods described above for securing and stowing the aircraft 140 is that at least one portion of the container can move relative to the aircraft for disassembly of at least portions of the aircraft. This can limit the amount of unconstrained or freehand handling that an operator must undertake when stowing the aircraft 140. An advantage of this feature is that the likelihood for inadvertently damaging the aircraft 140 as it is being secured and stowed can be reduced when compared with existing manual techniques for securing and stowing such aircraft. Another advantage of this feature is that the potential risk to people and nearby objects can be reduced. A system in accordance with an embodiment of the invention can provide for a secure and efficient cycle from flight through retrieval, dismantling, storing, servicing, assembly, checkout, launch, and back to flight and can include (a) a storage and assembly apparatus (such as a container); (b) means for supporting the storage and assembly apparatus at a station positioned for retrieval of the aircraft; (c) means for attaching the assembled aircraft to the storage and assembly apparatus; (d) means for controllably dismantling the aircraft and storing dismantled components of the aircraft within the storage and assembly apparatus; (e) means for servicing the aircraft within the container, including for example, means for transferring fuel and electrical power to the aircraft, and data to and/or from the aircraft; (f) means for supporting the storage and assembly apparatus at least proximate to a launch apparatus; (g) means for controlled assembly of the aircraft; and (h) means for controlled transfer of the aircraft to the launch apparatus such that the aircraft is available for launching.

In other embodiments, the systems and methods described above with reference to FIGS. 1A–12E can be used in conjunction with aircraft having configurations different than those described above. For example, in one embodiment shown in FIG. 13A, an aircraft 140a can include generally unswept wings 143a. In another embodiment shown in FIG. 13B, an aircraft 140b can include forward swept wings 143b. Line capture devices on the wings 143b can be installed toward the wing roots. In still another embodiment shown in FIG. 13C, an aircraft 140c can include delta wings 143c.

Figure 13A:
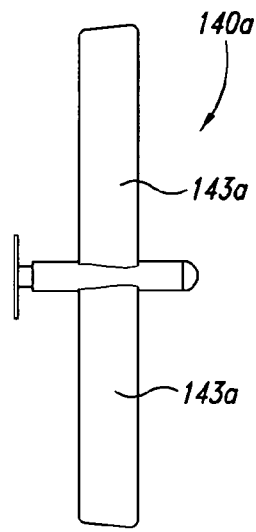
FIGS. 13A–13F are partially schematic illustrations of aircraft configurations in accordance with further embodiments of the invention.
Figure 13B:
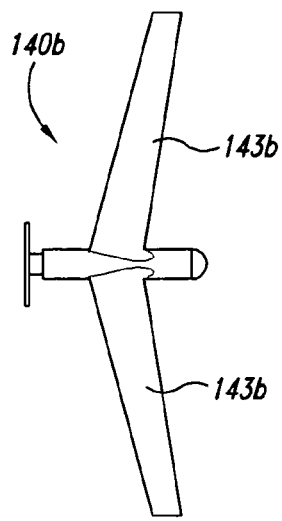
Figure 13C:
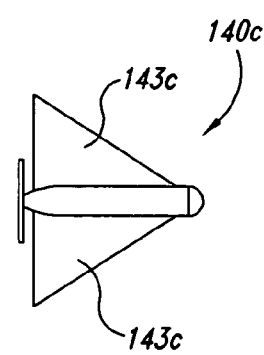
Figure 13D:
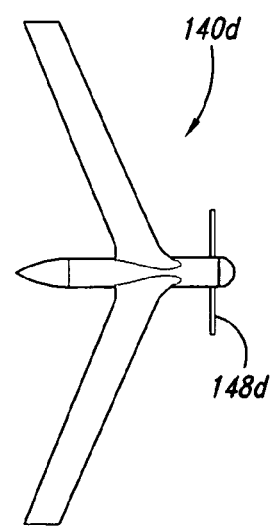
Figure 13E:
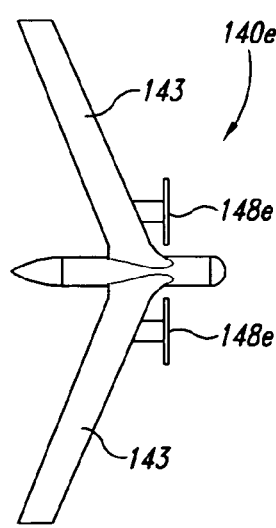
Figure 13F:
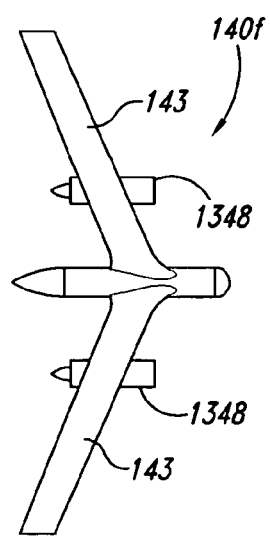

In still further embodiments, the aircraft can have propulsion systems that are different than, and/or are arranged differently than, those described above with reference to FIGS. 1A–12E. For example, as shown in FIG. 13D, an aircraft 140d can include a nose-mounted propeller 148d. In an embodiment shown in FIG. 13E, an aircraft 140e can include twin propellers 148e, each mounted to one of the wings 143. In still another embodiment shown in FIG. 13F, an aircraft 140f can include jet engines 1348 mounted to the wings 143. In still further embodiments, the aircraft can have other configurations, while remaining compatible with some or all of the systems and methods described above for storing, launching, and capturing the aircraft.

From the foregoing, it will be appreciated that specific embodiments of the invention have been described herein for purposes of illustration, but that various modifications may be made without deviating from the spirit and scope of the invention. For example, the systems described above can be used to store, launch and recover aircraft having arrangements different than those described above. In other embodiments, these systems can handle projectiles or other airborne devices. Further details of related systems and methods are described in the following co-pending U.S. applications, filed concurrently herewith and incorporated herein by reference: U.S. application Ser. No. 10/758,943, entitled "Methods and Apparatuses for Capturing and Storing Unmanned Aircraft, Including Methods and Apparatuses for Securing the Aircraft After Capture"; U.S. application Ser. No. 10/758,948, entitled "Methods and Apparatuses for Launching Unmanned Aircraft, Including Methods and Apparatuses for Transmitting Forces to the Aircraft During Launch"; U.S. application Ser. No. 10/758,956, entitled "Methods and Apparatuses for Capturing and Recovering Unmanned Aircraft, Including Extendable Capture Devices"; U.S. application Ser. No. 10/759,742, entitled "Methods and Apparatuses for Launching and Capturing Unmanned Aircraft, Including a Combined Launch and Recovery System"; U.S. application Ser. No. 10/759,545, entitled "Methods and Apparatuses for Capturing Unmanned Aircraft and Constraining Motion of the Captured Aircraft"; U.S. application Ser. No. 10/758,940, entitled "Methods and Apparatus for Capturing and Recovering Unmanned Aircraft, Including a Cleat for Capturing Aircraft on a Line"; U.S. application Ser. No. 10/759,541, entitled "Methods and Apparatuses for Launching, Capturing, and Storing Unmanned Aircraft, Including a Container Having a Guide Structure for Aircraft Components"; and U.S. application Ser. No. 10/758,955, entitled "Methods and Apparatuses for Launching Unmanned Aircraft, Including Methods and Apparatuses for Releasably Gripping Aircraft During Launch". Accordingly, the invention is not limited except as by the appended claims.

We claim:

1. An apparatus for launching an unmanned aircraft, comprising:

a first launch member;

a second launch member positioned at least proximate to the first launch member, at least one of the first and second launch members being movable relative to the other between a first position and a second position; and a launch carriage having an aircraft support positioned to releasably carry an unmanned aircraft during a takeoff operation, the launch carriage touching the launch members and being movable relative to the launch members between a first launch carriage location and a second launch carriage location as the at least one of the first and second launch members moves from the first position to the second position, wherein the launch carriage moves in a first direction between the first launch carriage location and the second launch carriage location, and wherein the at least one launch member moves in a second direction transverse to the first direction between the first position and the second position.

2. The apparatus of claim 1, further comprising a support structure, and wherein the first and second launch members are carried by the support structure.

3. The apparatus of claim 1, further comprising an actuator coupled to the at least one launch member to move the at least one launch member relative to the other.

4. The apparatus of claim 1, further comprising an actuator coupled to the at least one launch member to move the at least one launch member relative to the other, and wherein the actuator includes at least one of a hydraulic cylinder, a spring, a pneumatic cylinder, an electric motor, a flywheel, a steam-powered apparatus, an explosive charge, and a weight.

5. The apparatus of claim 1, further comprising an energy reservoir coupled to the at least one launch member to move the at least one launch member.

6. The apparatus of claim 1, further comprising:
an actuator; and
a transmission coupled between the actuator and the second launch member, wherein the transmission includes a first portion coupled to the actuator to receive a first force from the actuator and accelerate with a first acceleration, the transmission further including a second portion coupled to the second launch member to impart a second force and a second acceleration to the launch carriage, wherein the second force is different than the first force and the second acceleration is different than the first acceleration.

7. The apparatus of claim 1 wherein at least one of the first and second launch members includes a braking portion, and wherein the braking portion is positioned to contact and decelerate the launch carriage as the launch carriage moves from the first launch carriage location to the second launch carriage location.

8. The apparatus of claim 1 wherein at least one of the first and second launch members includes a curved portion, and wherein the curved portion is shaped to provide constant acceleration to the launch carriage as the at least one of the first and second launch members moves relative to the other.

9. The apparatus of claim 1 wherein:
the first launch member includes a first roller surface and the second launch member includes a second roller surface non-parallel to the first roller surface; and
the launch carriage includes a first wheel in rolling contact with the first roller surface and a second wheel in rolling contact with the second roller surface.

10. The apparatus of claim 1 wherein the first launch member includes a first surface in contact with the launch carriage, and wherein the second launch member includes a second surface in contact with the launch carriage, the second surface having a first portion oriented at a first angle relative to the first surface to accelerate the launch carriage, the second surface having a second portion oriented at a second angle relative to the first surface to decelerate the launch carriage, the second angle being different than the first angle.

11. The apparatus of claim 1 wherein the second launch member translates and pivots relative to the first launch member from the first position to the second position.

12. The apparatus of claim 1 wherein the second launch member includes a guide pin, and wherein the apparatus further comprises a guide having an elongated guide slot positioned between the first and second launch members, the guide pin being received in the guide slot to allow the guide pin to translate along the guide slot while the second launch member rotates relative to the first launch member.

13. The apparatus of claim 1, further comprising a carriage return coupled to the launch carriage, the carriage return being positioned to reset the launch carriage to the first launch carriage location after takeoff of the aircraft.

14. The apparatus of claim 1 wherein the at least one launch member moves in a generally vertical plane between the first position and the second position.

15. The apparatus of claim 1 wherein the at least one launch member moves in a generally horizontal plane between the first position and the second position.

16. The apparatus of claim 1 wherein the first and second launch members are coupled to each other with a cable and an arrangement of pulleys.

17. The apparatus of claim 1 wherein the first and second launch members are coupled to each other with a four-bar linkage.

18. The apparatus of claim 1 wherein the first and second launch members are pivotable relative to each other.

19. The apparatus of claim 1 wherein the first launch member includes a first roller surface and the second launch member includes a second roller surface non-parallel to the first roller surface, and wherein the angle between the first and second roller surfaces is greater when the launch carriage is in the second launch carriage location than when the launch carriage is in the first launch carriage location.

20. The apparatus of claim 1, further comprising the unmanned aircraft.

21. An apparatus for launching an unmanned aircraft, comprising:
a support structure;
a first launch member fixed relative to the support structure;
a second launch member coupled to the support structure, the second launch member being movable relative to the support structure and the first launch member;
an actuator coupled to the second launch member and positioned to move the second launch member relative to the first launch member from a first position to a second position; and
a launch carriage having an aircraft support positioned to releasably carry an unmanned aircraft during a takeoff operation, the launch carriage being in direct contact with the first and second launch members and being movable relative to the first and second launch members between a first launch carriage location and a second launch carriage location as the second launch member moves from the first position to the second position, wherein the first launch member includes a first surface in contact with the launch carriage, and wherein the second launch member includes a second surface in contact with the launch carriage, the second surface having a first portion oriented at a first angle relative to the first surface to accelerate the launch carriage, the second surface having a second portion oriented at a second angle relative to the first surface to decelerate the launch carriage, the second angle being different than the first angle.

22. The apparatus of claim 21 wherein the actuator includes at least one of a hydraulic cylinder, a spring, a pneumatic cylinder, an electric motor, a flywheel, a steam-powered apparatus, an explosive charge, and a weight.

23. The apparatus of claim 21, further comprising a transmission coupled between the actuator and the second launch member, wherein the transmission includes a first portion coupled to the actuator to receive a first force from the actuator and accelerate with a first acceleration, the transmission further including a second portion coupled to the second launch member to impart a second force and a second acceleration to the launch carriage, wherein the second force is different than the first force and the second acceleration is different than the first acceleration.

24. The apparatus of claim 21 wherein:
the first launch member includes a first roller surface and the second launch member includes a second roller surface non-parallel to the first roller surface; and
the launch carriage includes a first wheel in rolling contact with the first roller surface and a second wheel in rolling contact with the second roller surface.

25. The apparatus of claim 21 wherein the second launch member translates and pivots relative to the first launch member as the second launch member moves from the first position to the second position.

26. The apparatus of claim 21, further comprising a carriage return coupled to the launch carriage, the carriage return being positioned to reset the launch carriage to the first launch carriage location after takeoff of the aircraft.

27. An apparatus for launching an unmanned aircraft, comprising:
a first launch member;
a second launch member pivotally coupled to the first launch member, at least one of the first and second launch members being pivotable relative to the other between a first position and a second position;
an actuator coupled to the at least one launch member and positioned to pivot the at least one launch member from the first position to the second position; and
a launch carriage having an aircraft support positioned to releasably carry an unmanned aircraft during a takeoff operation, the launch carriage being in contact with the first and second launch members, the launch carriage being forced to move relative to the launch members between a first launch carriage location and a second launch carriage location as the at least one launch member moves from the first position to the second position.

28. The apparatus of claim 27 wherein the first launch member includes a first surface in contact with the launch carriage, and wherein the second launch member includes a second surface in contact with the launch carriage, the second surface having a first portion oriented at a first angle relative to the first surface to accelerate the launch carriage, the second surface having a second portion oriented at a second angle relative to the first surface to decelerate the launch carriage, the second angle being different than the first angle.

29. The apparatus of claim 27 wherein:
the first launch member includes a first roller surface and the second launch member includes a second roller surface non-parallel to the first roller surface; and
the launch carriage includes a first wheel in rolling contact with the first roller surface and a second wheel in rolling contact with the second roller surface.

30. The apparatus of claim 27 wherein the at least one launch member moves in a generally lateral plane.

31. The apparatus of claim 27 wherein each of the first and second launch members pivots relative to the other.

32. The apparatus of claim 27 wherein the actuator includes at least one of a hydraulic cylinder, a spring, a pneumatic cylinder, an electric motor, a flywheel, a steam-powered apparatus, an explosive charge, and a weight.

33. The apparatus of claim 27 wherein:
the first and second launch members each include a first end portion and a second end portion spaced apart from the first end portion;
the first end portions of the first and the second launch member are pivotally coupled together; and
the second end portions of the first and the second launch members are coupled to the actuator, and wherein the actuator is positioned to move the second end portions of the first and the second launch member apart from each other.

34. The apparatus of claim 27, further comprising a carriage return coupled to the launch carriage, the carriage return being positioned to reset the launch carriage to the first launch carriage location after takeoff of the aircraft.

35. An apparatus for launching an unmanned aircraft, comprising:
a first launch member;
a second launch member positioned at least proximate to the first launch member, at least one of the first and second launch members being movable relative to the other between a first position and a second position; and
a launch carriage having an aircraft support positioned to releasably carry an unmanned aircraft during a takeoff operation, the launch carriage being in contact with the first and second launch members, the launch carriage being movable relative to the launch members in a first direction between a first launch carriage location and a second launch carriage location as the at least one of the first and second launch members moves from the first position to the second position in a second direction transverse to the first direction.

* * * * *